INVENTOR
Theodore W. Kenyon
BY
Morgan, Finnegan + Durham
ATTORNEYS

INVENTOR
*Theodore W. Kenyon*
BY
Morgan, Finnegan & Durham
ATTORNEYS

AUTOMATIC PILOT

Filed Feb. 1, 1946

INVENTOR
Theodore W. Kenyon
BY Morgan, Finnegan + Durham
ATTORNEYS

INVENTOR
Theodore W. Kenyon
BY
Morgan, Finnegan & Durham
ATTORNEYS

April 30, 1957 T. W. KENYON 2,790,612

AUTOMATIC PILOT

Filed Feb. 1, 1946 15 Sheets-Sheet 5

INVENTOR

Theodore W. Kenyon

BY

Mayan, Finnegan & Durham

ATTORNEYS

April 30, 1957 T. W. KENYON 2,790,612

AUTOMATIC PILOT

Filed Feb. 1, 1946 15 Sheets-Sheet 6

INVENTOR

Theodore W. Kenyon

BY

Morgan, Finnegan & Durham

ATTORNEYS

April 30, 1957 T. W. KENYON 2,790,612

AUTOMATIC PILOT

Filed Feb. 1, 1946 15 Sheets-Sheet 7

INVENTOR.

Theodore W. Kenyon

BY

Morgan, Finnegan and Durham

ATTORNEYS

AUTOMATIC PILOT

Filed Feb. 1, 1946 15 Sheets-Sheet 8

INVENTOR
Theodore W. Kenyon
BY
Morgan, Finnegan and Durham
attorneys

AUTOMATIC PILOT

INVENTOR
Theodore W. Kenyon
BY Morgan Finnegan and Durham
Attorneys

INVENTOR
Theodore W. Kenyon
BY
Mason, Fenwick & Lawrence
ATTORNEYS

INVENTOR
Theodore W. Kenyon
BY Morgan, Finnegan and Durham
ATTORNEYS

April 30, 1957 T. W. KENYON 2,790,612

AUTOMATIC PILOT

Filed Feb. 1, 1946 15 Sheets-Sheet 12

INVENTOR.

Theodore W. Kenyon

BY Morgan Finnegan & Durham

ATTORNEYS.

April 30, 1957 T. W. KENYON 2,790,612

AUTOMATIC PILOT

Filed Feb. 1, 1946 15 Sheets-Sheet 13

INVENTOR.

Theodore W. Kenyon

BY

Morgan, Finnegan and Durham

ATTORNEYS

April 30, 1957

T. W. KENYON

AUTOMATIC PILOT 2,790,612

Filed Feb. 1, 1946

15 Sheets-Sheet 14

INVENTOR

Theodore W. Kenyon

BY

Morgan, Finnegan & Durham

ATTORNEYS

INVENTOR
Theodore W. Kenyon
BY
Morgan, Finnegan & Durham
ATTORNEYS

United States Patent Office 2,790,612

Patented Apr. 30, 1957

2,790,612

AUTOMATIC PILOT

Theodore W. Kenyon, Huntington, N. Y., assignor, by mesne assignments, to the United States of America as represented by the Secretary of the Navy Application February 1, 1946, Serial No. 644,797

9 Claims. (Cl. 244—76)

The present invention relates to automatic means for controlling the flight of an airplane and more particularly to gyroscopically and manually controlled means by which an airplane may be automatically controlled and may be optionally manually controlled through the power units of the automatic control at the will of the pilot.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 2:
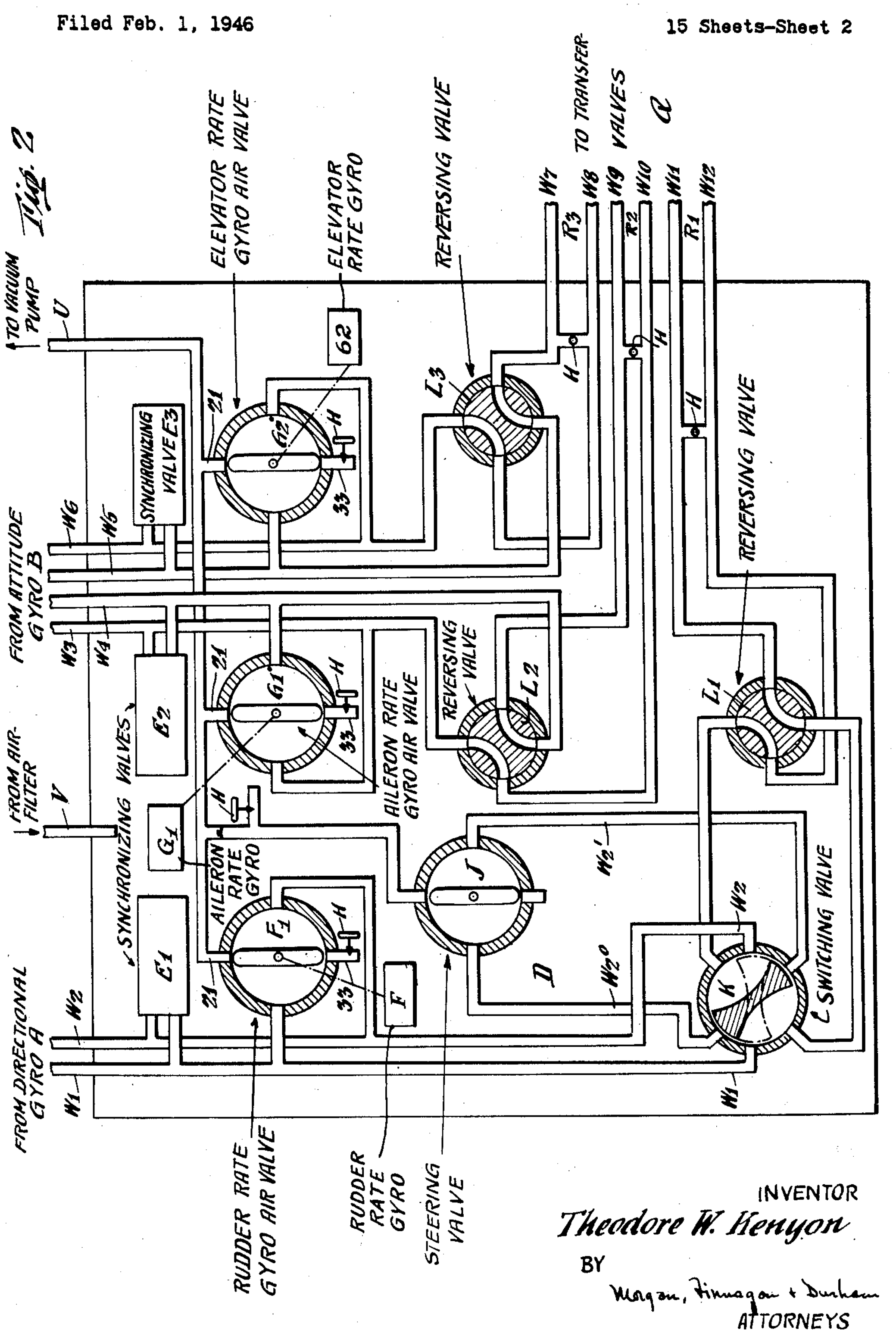
Figure 2 is a more detailed schematic view showing the various units which are comprised within the stabilizing unit of the present embodiment.
Figures 9, 10, 10A, 19, 20:
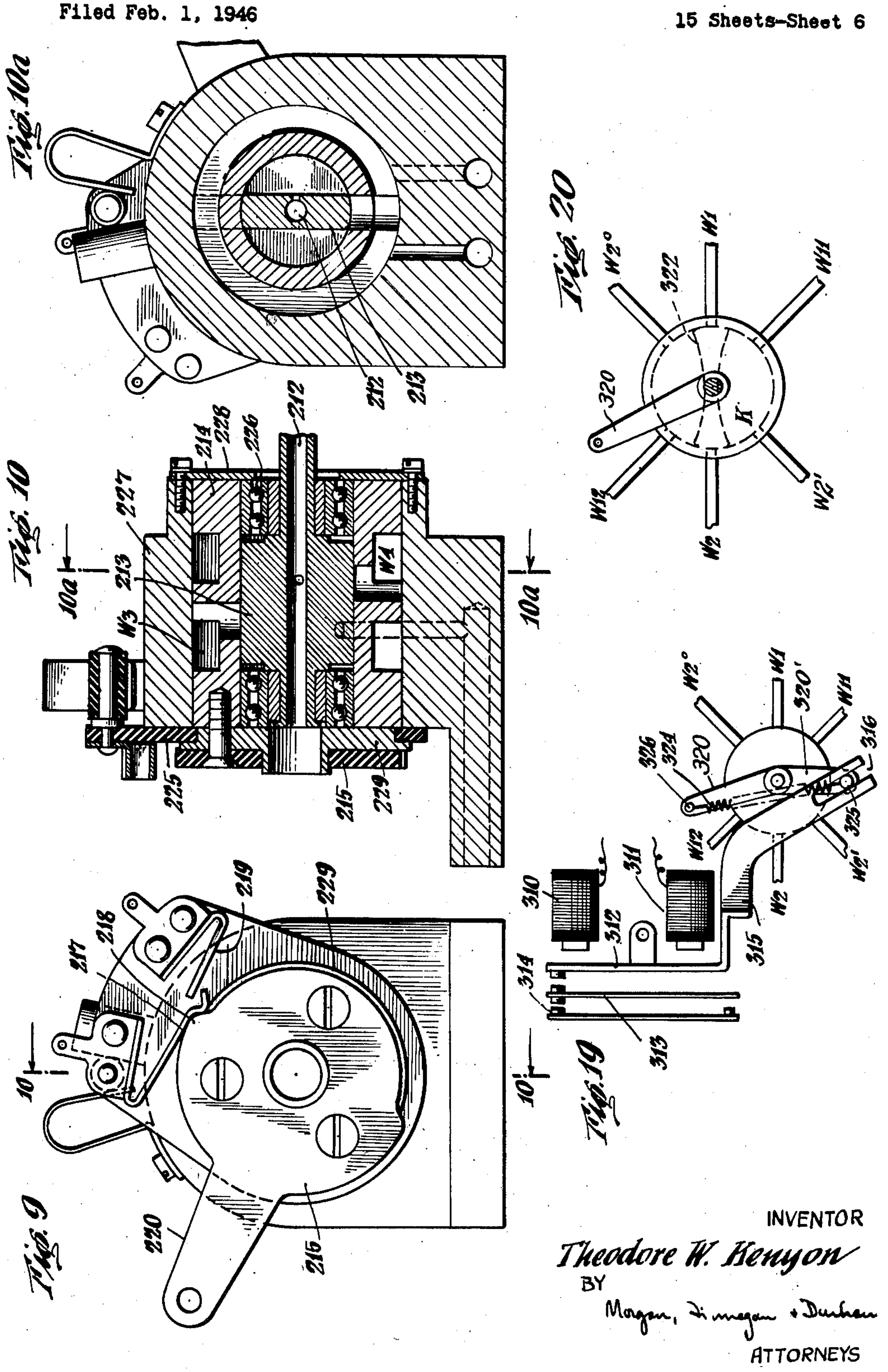
Figure 9 is a detailed end elevation of a switch forming part of the device shown in Figure 8.
Figure 10 is a sectional view taken on the line 10—10 of Figure 9.
Figures 11, 12:
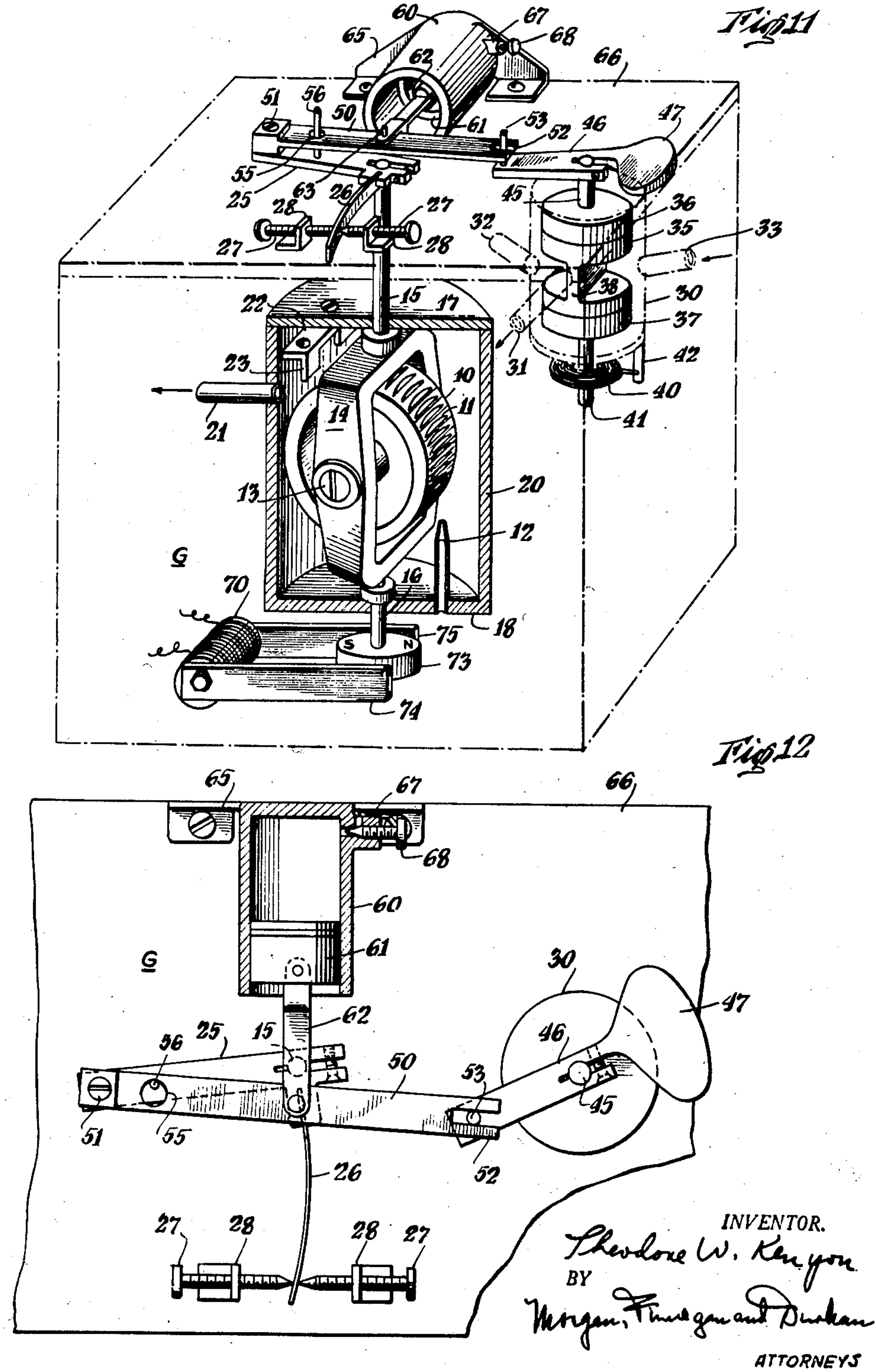
Figures 21, 22, 23, 23A, 23B, 24, 24A, 24B, 25, 25A, 25B:
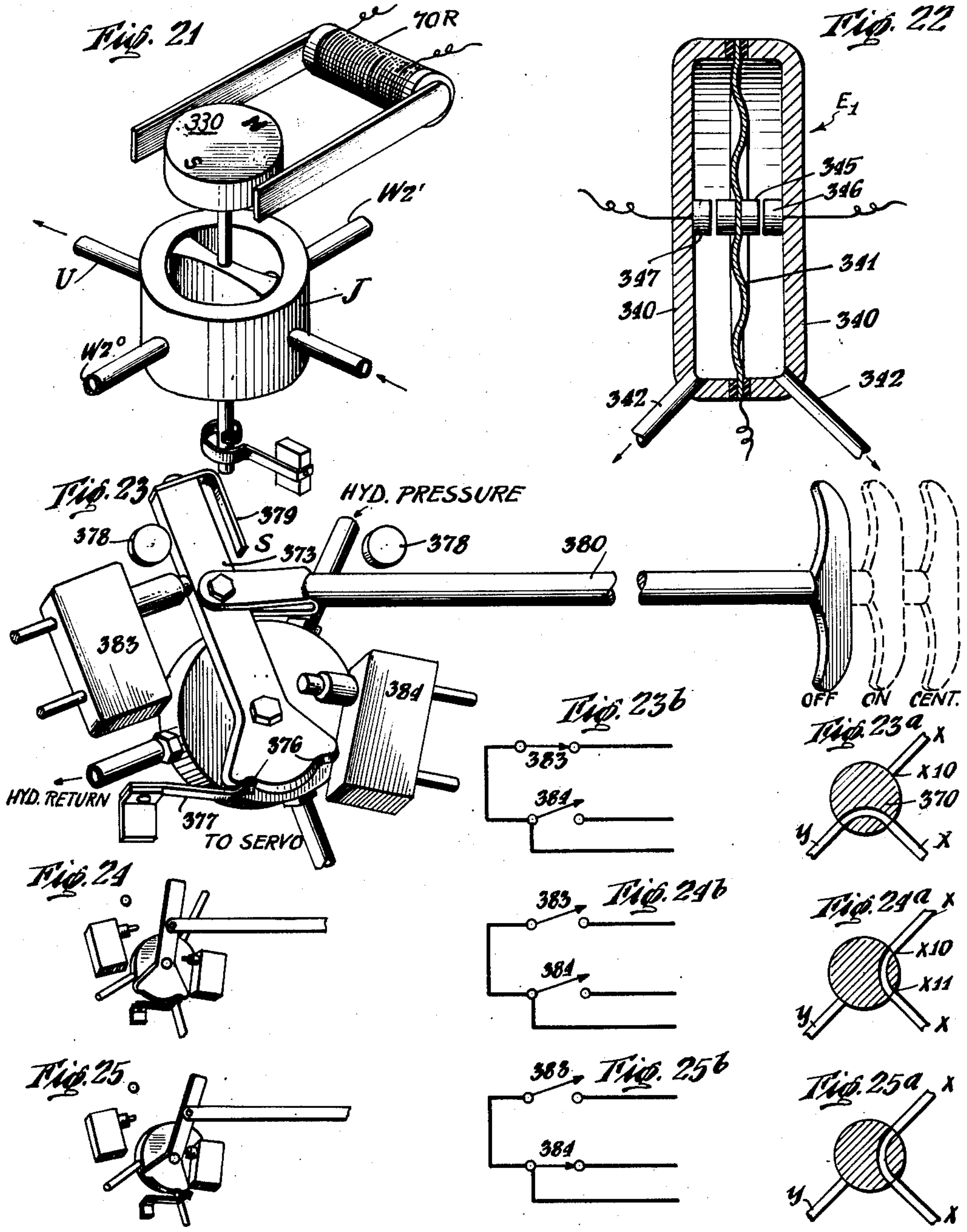
Figure 26:
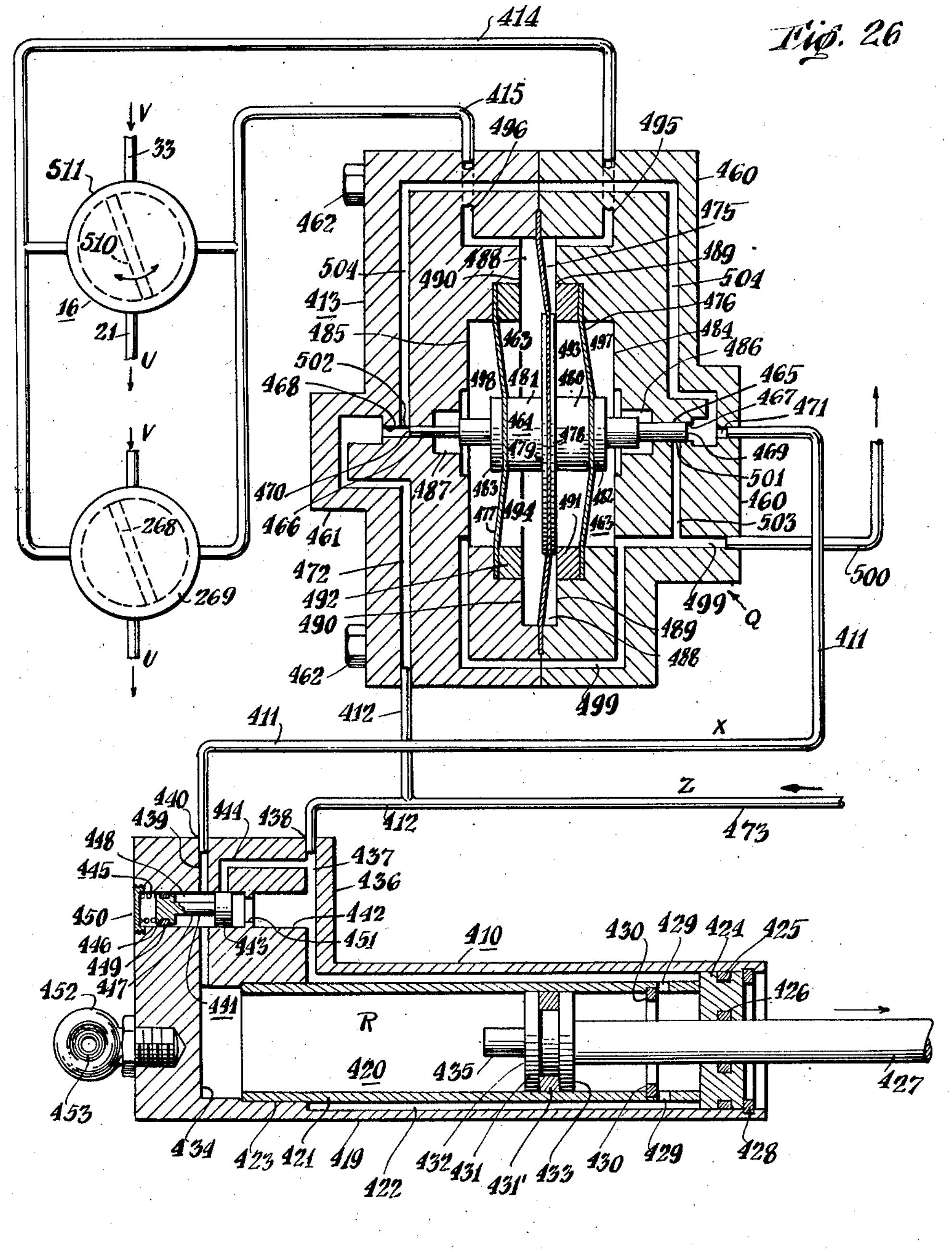
Figure 27:
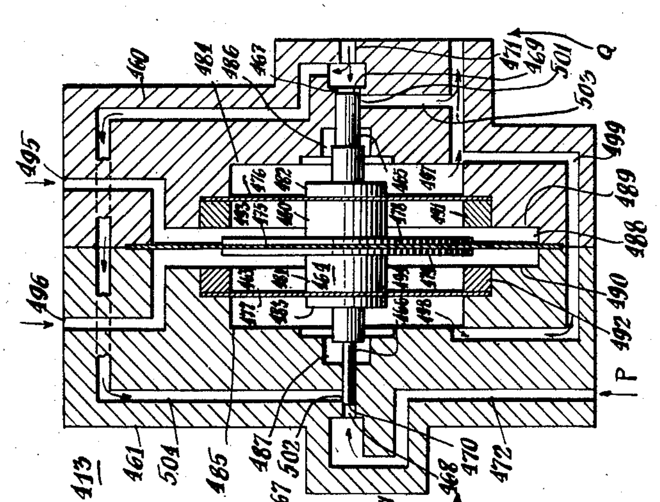
Figure 29:
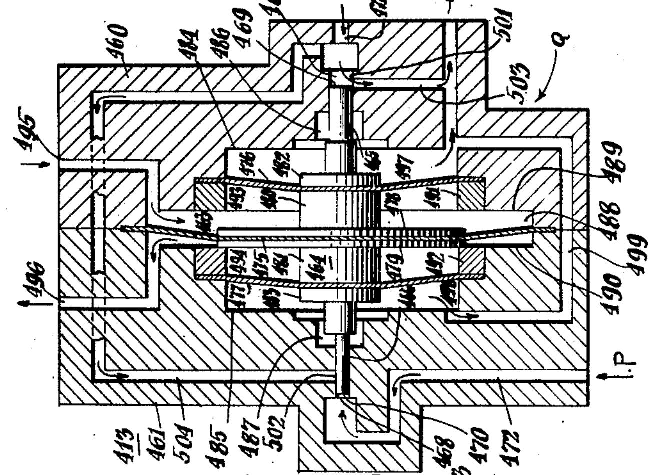
Figure 28:
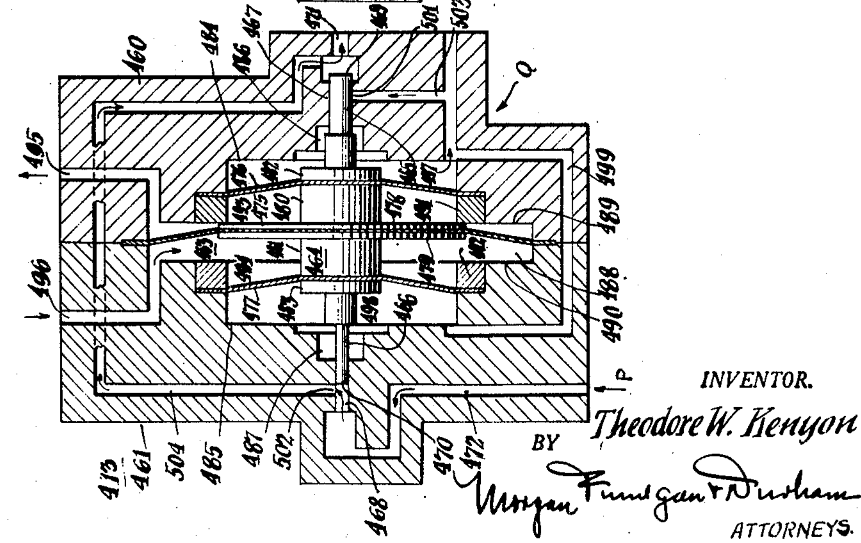
Figure 30:
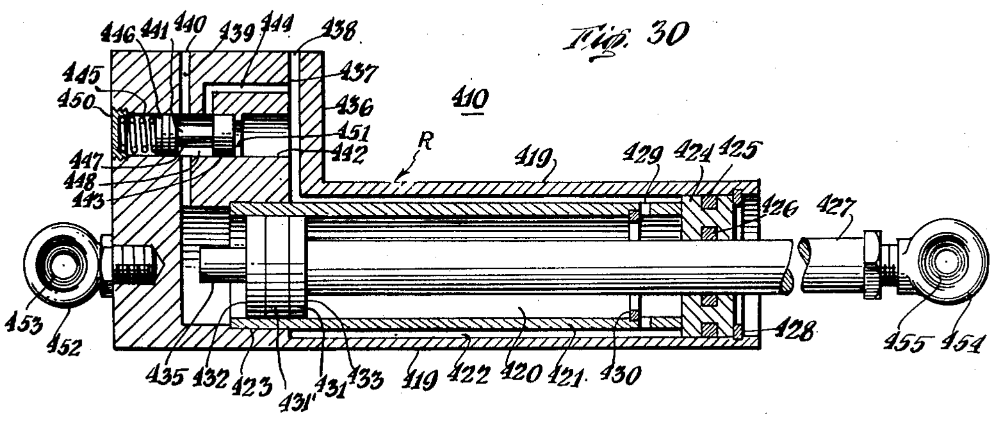
Figure 31:
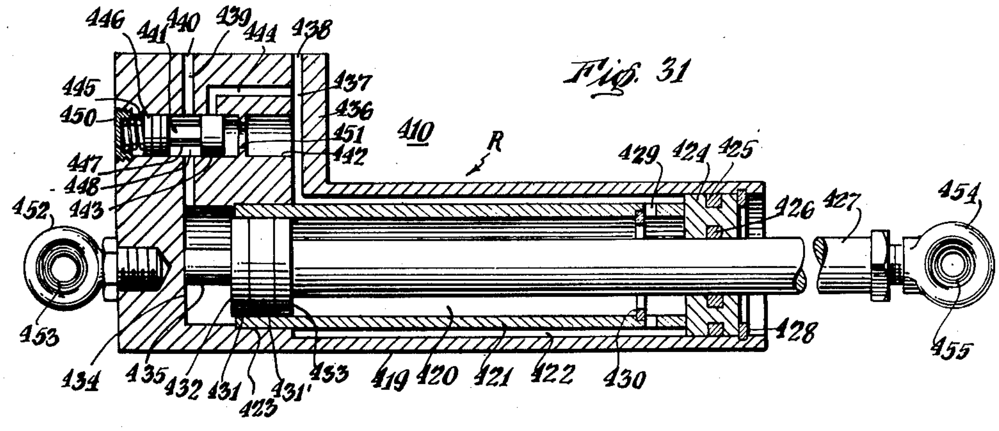
Figure 32:
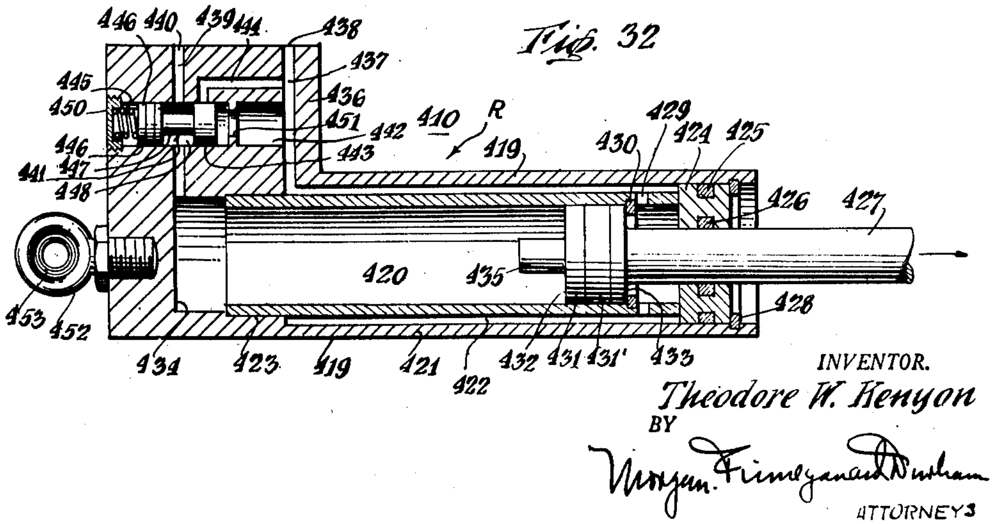
Figure 33A:
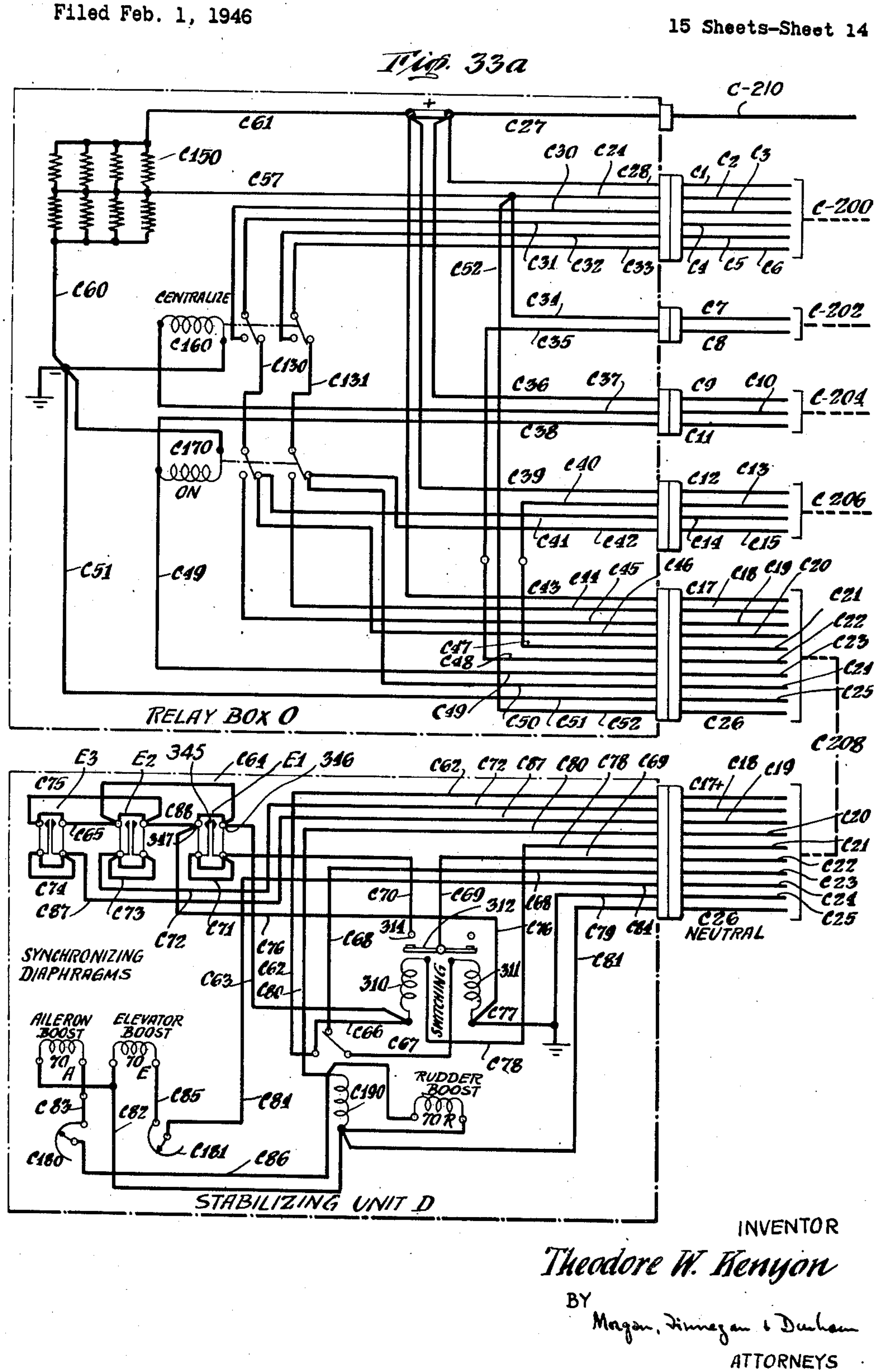
Figure 33B:
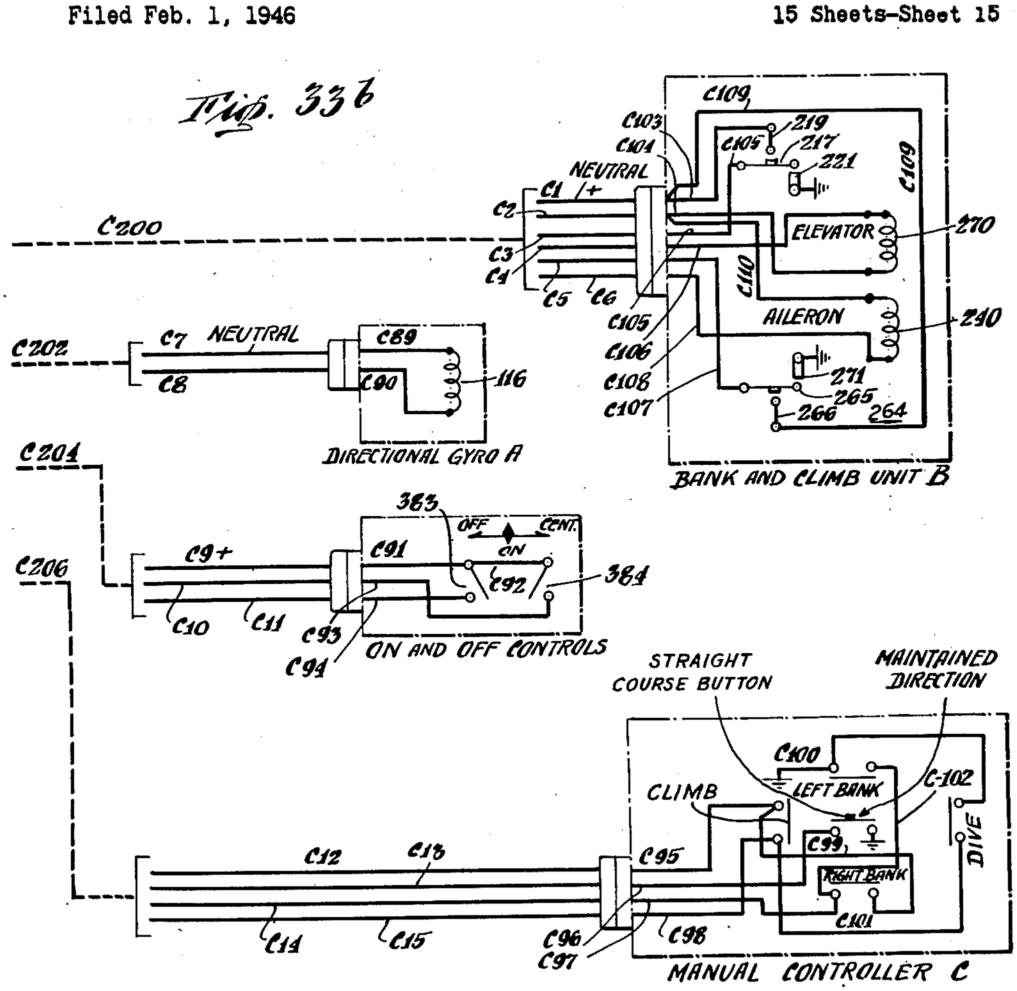
Figure 34:
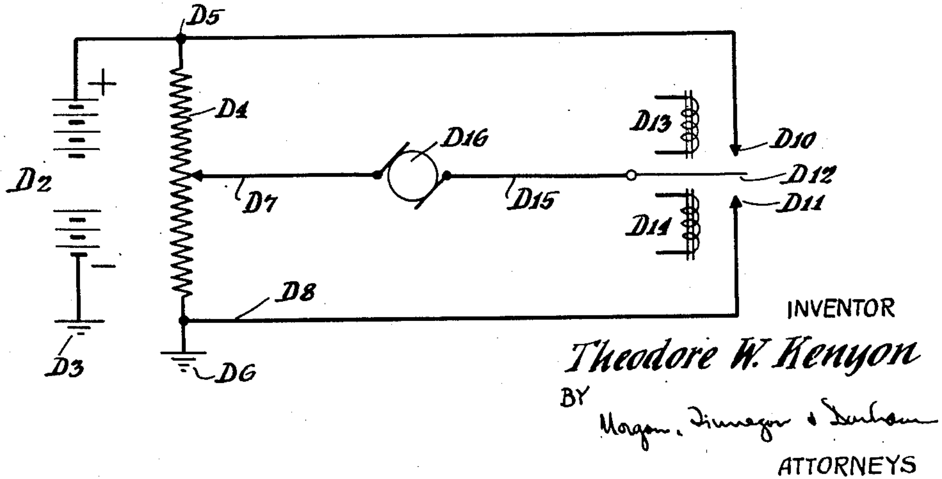

Figure 10*a* is a sectional view taken on the line **10*a*—10*a*** of Figure 10;

Figure 11 is a perspective view showing a typical and illustrative embodiment of the rate gyro, being shown with an air driven gyroscope controlling a valve for creating air signals;

Figure 12 is a schematic plan view of certain parts of the rate gyroscope of Fig. 11 showing them in a displaced position;

Figures 13 to 18 are various views showing schematically the relative relation of the principal parts of the rate gyroscope of Fig. 11 as it is subject to different forces by turning of the aircraft or other vehicle;

Figure 19 is a fragmentary detailed view of a switching valve used in the present embodiment of the invention;

Figure 20 is a diagrammatic view of the valve mechanism forming part of the unit shown in Figure 19;

Figure 21 is a diagrammatic view of the steering valve used in the stabilizing unit of Figure 2;

Figure 22 is a diagrammatic sectional view of synchronizing valves or diaphragms used in the stabilizing unit of Figure 2;

Figure 23 is a diagrammatic view showing the main on-off control means comprising electrical switches and a hydraulic valve, being shown in the off position;

Figure 24 shows the control means in the on position;

Figure 25 shows the control means in its temporary centralizing position;

Figures 23*a*, 24*a* and 25*a* show the valve positions corresponding to the respective positions of the control means;

Figures 23*b*, 24*b* and25*b* show the corresponding positions of the electrical switching means;

Figure 26 is a somewhat diagrammatic view, with parts in section, of a typical and illustrative embodiment of a hydraulic servo-motor system in accordance with this invention, depicting the several elements of the system including the signal input control valve, the transfer or relay valve and the hydraulic servo-motor in a typical operative relationship;

Figures 27, 28 and 29 are views in section, respectively, of a typical and illustrative embodiment of a transfer or relay valve in accordance with this invention, corresponding to the transfer valve shown in Figure 26, the view Figure 27 showing the valve as it would appear with its working parts in a central or neutral position corresponding to a no-signal condition in the system of Figure 26, the views, Figures 28 and 29, showing the valve with its working parts in opposite extremes of position corresponding to maximum signal conditions but of opposite sign in the system of Figure 26, the position of the working parts of the valve as shown in Figure 28 corresponding to the position of the valve parts in the showing in Figure 26;

Figures 30, 31 and 32 are views in section of a typical and illustrative embodiment of a hydraulic servo-motor in accordance with this invention corresponding to the servo-motor shown in Figure 26, the view, Figure 30, showing the servo-motor with its by-pass slide-valve in open position corresponding to a pressure-off condition in the system and the views, Figures 31 and 32, showing the motor with its by-pass slide-valve in a closed position corresponding to a pressure-on condition in the system and also showing the motor with its piston at opposite extremes of position in its cylinder;

Figures 33*a* and 33*b* are the circuit diagram for the entire flight control means shown in the other figures; and Figure 34 is a schematic view illustrating a simple circuit embodying the motor reversal means utilized in the present embodiment for each of the several electric motors.

The present invention has for its object the provision of a novel and improved automatic pilot for the control of aircraft in flight. A further object is the provision of an improved power control means by which the aircraft may be maneuvered by the pilot at will with respect to attitude and course. The invention provides a maneuverable automatic pilot which is always ready in flight to be engaged at the will of the human pilot, and when engaged will automatically maintain the aircraft in a desired attitude and on a fixed course, permits maneuvering of the aircraft as to bank, climb or course, or alternatively permits the human pilot to bring the aircraft to unbanked level flight on an arbitrary heading by maniplulation of a single control.

The invention has for a further object the provision of a novel and improved automatic pilot having all its normal controls on a single device so that the operations required to be performed by the human pilot are simplified and simulate the operations required for conventional manual control of an airplane. A further object is the provision of an automatic pilot in which a single control provides means for returning the aircraft to normal, level flight from any assumed attitude, which control may be actuated in any position of the airplane (within limits).

The invention provides an automatic pilot which is exceedingly light in weight, reliable in operation and relatively simple, using substantially standard flight instruments as a portion of primary control means. The invention further provides novel and improved forms of signal producing means, having followup means, on both the directional control and bank and climb control units.

The invention further provides a flight control unit in which any change in the direction (climb, bank or course) of flight may instantly establish a corrective force, and likewise any change in attitude or rate of angular movement of the aircraft about any one or more of its three axes of movement may establish a corrective force. Also, the invention provides a flight control unit, which when operated manually, rather than by gyroscopic means, establishes a momentary large and diminishing signal so that the pilot tends not to overcontrol the aircraft.

The invention has for its object the provision of a novel and improved automatic pilot, optionally maneuverable as to all, or certain controls by which an aircraft may be controlled in flight.

Another object of this invention is to enable an automatic pilot to fly the airplane smoothly without continuous hunting around any axis throughout the normal operating speed range of the aircraft with sufficient power and with sufficient quickness of response to keep the airplane within a safe attitude in all but the severest air conditions.

Another object of this invention is to enable an automatic pilot to be subject to the control of the airplane pilot in the "Pilot on" condition through the provision of a manually operated maneuvering control lever having substantially the same movement and effect pattern as the conventional control stick or column, with the added advantage that bank and turn are combined by sidewise movement of the maneuvering control lever to produce a co-ordinated turn without undue slip or skid.

Another object of this invention is to enable the automatic pilot to be made subject to the control of the airplane pilot through the provision of the maneuvering control lever in such fashion that as long as the maneuvering control lever is held in a position other than neutral, the attitude of the airplane will continue to change (up to the limits of the pilot) until the control lever is released whereupon the new attitude of the airplane will be maintained by the automatic pilot.

Another object of this invention is to enable the airplane pilot to overpower the automatic pilot without undue effort on his part.

In accordance with the present preferred embodiment of present invention, there is provided a directional control means A, illustratively a directional gyro compass, a bank and climb control means B, illustratively a Sperry artificial horizon with suitable modifications, and a manually operated controller C which can be optionally operated to cause the plane to dive, climb, or turn to the left or right, or alternatively may be conditioned so that the airplane maintains whatever attitude it may have assumed at the time the pilot wishes controlled flight instead of uniform flight.

Preferably and illustratively, the system is powered by vacuum (about 4" mercury) to drive the several units which are conveniently of the gyroscopic type, while the power units are preferably powered by hydraulic pressure such as oil pressure ranging from 1000 p. s. i. to 3000 p. s. i., the hydraulic pressure being controlled in its application to the several power units, directly or indirectly by the relatively low vacuum differential established between two lines, each of which may normally be subject to the same pressure, but by differential flow of the air through valves may be caused to have different pressures operating on the valve means controlling the hydraulic pressure.

The spatial movements of the controlling units A and B, combine with the movements of the space stable element in the stabilizing unit D, responsive to movement of the plane with respect to any one of its three axes combine to control the attitude of the airplane and to restore it to any preselected course or attitude. Preferably a rate gyroscope F of any conventional design and having an air valve F1 senses any deviation in course of the airplane, correcting the rudder to maintain the airplane on course, while a pair of derivative rate gyros G1 and G2 of any conventional design and having air valves G1° and G2° respectively serve not only to sense any deviation from normal of the airplane in its climb or descent, but also any such deviation in bank of the airplane. Thus, the airplane may be caused to assume and maintain a normal straight, level, unbanked flight, or it may be caused to assume any desired attitude or course and is so controlled as to maintain that attitude or course, and at any desired time the human pilot may interrupt the automatic control and cause the airplane to be maneuvered at will, or having set the plane into a spiral downward course, or any other course, the human pilot may control the device so that the plane continues to turn, bank and dive at the same rate and angle.

The rate gyros G1 and G2 sense not only any angular change in movement of the airplane, but also are responsive to any change in the rate of angular movement, one responding to changes in the rate of angular movement with respect to a horizontal transverse axis, while the other is responsive to any change in the rate of movement with respect to a horizontal axis coinciding with the line of flight.

Thus, a change from level flight to a climb causes one of the derivative gyros G2 to be actuated, a change from unbanked to banked flight causes another derivative gyro G1 to be actuated, while a change in course causes the rate gyro F to be actuated. Likewise, any change in the angular acceleration of climbing or banking causes the corresponding gyro to be actuated.

Means are provided whereby the automatic controls may be placed in operation or may be placed out of operation at will, and also so that when placed in operation the airplane may or may not continue its same attitude.

Means including reversing valves L1, L2, and L3 are also provided for reversing the direction of various of the differential air pressure signals so that identical apparatus may be installed on airplanes of the type which require a specific control surface actuator to be pushed for a certain effect on flight, and also on those models which require the same actuator to be pulled for an identical effect on flight.

A follow up mechanism is provided on the directional instrument controlling the flight, and also on the bank and turn instrument, whereby the controls associated with the instruments may also be in a position ready to be brought into operative relation to the flight control device and assume automatic control of the flight.

The stabilizing unit in accordance with the preferred embodiment of the invention provides means whereby the same attitude or course of flight may be maintained under automatic control. This unit includes rate gyroscopes, some or all of which are preferably constructed to be responsive not only to rate but also to a change in rate of angular movement, and also includes synchronizing means whereby any deviation from normal in the position of the airplane with respect to any one of its three axes causes the controls from the directional unit or bank and climb unit to be adjusted accordingly.

The flight control means as a whole operates on turns to set the proper bank of the airplane for the turn and then allows the rudder to assume the proper bank for the turn to be executed.

The flight control means also provides means whereby the human pilot may maneuver the airplane at will from the control means of the plane, or alternatively from the control means through the power means, and may instantly condition the power means so that the airplane continues in any turn, climb or bank or combined turn, climb and bank and yet may be instantly centralized so that the airplane will return to a normal level, unbanked, straight course of flight.

Means are provided for initially boosting certain or all of the control surfaces as they are power actuated under manual control, thus giving a momentary overcontrol so that the airplane responds more quickly and the pilot senses that the control surface has been actuated.

Means are also provided in the apparatus whereby the direction of control with reference to a given signal may be reversed at will, thereby enabling the apparatus to be installed easily in different airplanes, one of which may require a pushing operation for control in a given direction while another may require a pulling operation for a similar control operation.

The apparatus is illustratively embodied with means which translate a vacuum signal, or differential air pressure signal into a hydraulic motive force through various transfer or relay valves and also embody means by which more than one signal may be combined to produce a motive force acting responsive to the combined or composite signal.

The present preferred and illustratively embodied form of the automatic pilot may be described generally as a self-synchronous, maneuvering pilot operated by only two manual controls; an on-off control and a maneuvering control.

Synchronization is a continuous automatic adjustment relative to the position of the airplane which assures continuation of the existing flight attitude at the moment of engagement of the automatic pilot. This eliminates any necessity of adjusting knobs or setting dials before the pilot is turned on.

Maneuvers, within the limits of the automatic pilot, may be accomplished by simple manipulation of the controller. Dives, climbs, banks, coordinated turns, and climbing and diving turns can be achieved by finger-tip operation of the controller lever. Any desired course may be maintained merely by depressing a button which is mounted on the controller lever.

The automatic pilot forming the instant invention is preferably capable of maintaining a left or right bank of 45 degrees, a climb angle of 30 degrees, and a dive angle of 50 degrees.

The automatic pilot is engaged or disengaged by means of a control handle. The handle has three positions: "On," "Off," and "Centralized." The "Centralized" position is one which brings the airplane out to a straight and level attitude.

In an emergency, the autopilot may be overpowered without undue effort on the part of the operator.

The equipment consists of eight units: a directional gyro control unit, a bank and climb control unit, a stabilizing unit, a transfer valves assembly, three servo cylinders, a relay box, an on-off control assembly, and a controller.

*Directional gyro control unit*

A typical standard directional gyro control unit contains the gyro which provides a reference for both manual and automatic rudder control. The air-driven gyro rotor rotates with its spin axis horizontal. Due to gyroscopic inertia, the spin axis continues to point in the same direction, even though the aircraft yaws. This relative motion between the gyro and the instrument case is shown on the face of the instrument by a dial, similar to a compass card. The dial, when set to agree with the magnetic compass, provides an azimuth indication that is free from "swing."

The caging mechanism, operated by a caging knob on the front of the unit, provides a means of locking the gyro unit so as to prevent damage to the instrument during maneuvers that may exceed its operating limits. Setting of the gyro dial to the desired reading is accomplished with the same knob.

The dial is attached to the vertical ring and is graduated in 360 degrees of azimuth similar to a compass card. It is visible to the operator through an opening in the front of the case.

The directional gyro control unit of the present invention differs from the standard directional gyro indicator, described above as follows:

The top bearing of the vertical gimbal ring has been removed and in its place an air valve and bearing are substituted.

A hole has been drilled in the top of the indicator case to accept a gear box assembly. This assembly comprises a rotatable outer sleeve for an air valve, and a worm gear to actuate the rotatable valve sleeve. The worm is driven through a coupling, the latter having its take-off mounted on the rear cover plate of the instrument.

The standard rear cover plate has been redesigned to include sufficient housing area to house the following items: a 27.5-volt electric motor with a worm affixed to its shaft driving a worm gear which in turn drives a coupling; two ¼-inch pipe vacuum connections; a motor recess cover plate mounting a 2-conductor air signal receptacle fitting and a 2-conductor electrical receptacle fitting.

The standard adapter plate, located at the bottom of the indicator, has been revised to include a sandwich filter element.

An adapter, which is mounted on the rear cover, has been substituted for the standard adapter housing. The new adapter connects the standard adapter plate and the top gear box, and is designed to accept the ¼-inch pipe air inlet standard fittings.

*Bank and climb gyro control unit.*—This unit consists of applicable portions of a standard gyro horizon indicator, with additional units to make it a complete assembly. These additions are outlined below.

The bank and climb gyro control unit contains the gyro which provides a reference for both manual and automatic aileron and elevator control. The air-driven gyro rotor rotates with its spin axis vertical. Due to gyroscopic inertia the spin axis continues to point in the same direction, even though the aircraft rolls or pitches. Any relative motion between the gyro and the instrument case is shown on the face of the instrument by either the tilt of the bar or the raising or lowering of it, relative to the miniature airplane. The position of the miniature airplane can be raised or lowered in relation to the horizon bar by the adjusting knob in order to compensate for various load conditions of the airplane.

The caging mechanism, operated by the caging knob on the front of the unit, provides a means of locking the gyro in a level position during maneuvers that may exceed its operating limits.

The bank and climb gyro control unit of the present invention consists of applicable portions of a standard gyro horizon indicator, outlined above, with the following additional units to make it a complete assembly.

Except for the rear bulkhead, the complete case of the standard indicator is used. The gyro assembly is substantially a 70-degree autopilot gimbal assembly.

The redesigned rear bulkhead includes the following items: a bank pick-off motor and valve assembly; a pitch pick-off motor and valve assembly; necessary connections for vacuum supply to the case; necessary air inlet and filter connections; an electrical receptacle for motor power; and, an air conduit receptacle for air signal connections to the stabilizing unit.

The bank pick-off valve is geared directly in a 1:1 ratio to the standard gimbal gear of the unit. The pick-off valve is geared to the horizon bar pivot shaft by means of a nylon cord passing through the central axis of the gimbal.

*Stabilizing unit.*—This unit is a shock-mounted assembly consisting of the following parts:

*Rudder rate gyro unit.*—The rudder rate gyro unit is supported at one end by an angle on the manifold block and at the other end by an angle on the cover plate. It consists of a gyroscope assembly in an air-tight housing, an air direction valve and centering spring, and a leaf spring and stops to restrain the movement of the gyro gimbal, all mounted on a base plate.

*Aileron rate gyro unit.*—The aileron rate gyro unit is supported at one end by an angle on the manifold block and at the other by two posts on the cover plate. It is similar to the rudder rate gyro with the addition of a torque motor mounted on the gyroscope housing and connected to the gyro gimbal shaft. In addition, the unit contains an adjustable dashpot linkage between the air valve and the shaft in the end of the gyro gimbal. The aileron rate gyro unit is mounted so that it is sensitive to roll.

*Elevator rate gyro unit.*—The elevator rate gyro unit is identical with the aileron rate gyro unit, except that it is mounted so that it is sensitive to pitch instead of roll.

*Synchronizing diaphragms.*—There are three synchronizing diaphragms mounted on the inside of the cover plate. They control two pick-off motors in the bank and climb control and one in the directional gyro control.

*Cover plate.*—The cover plate contains the receptacles for the air signal connections to the bank and climb control, the directional gyro control, and the transfer valves assembly; an electrical receptacle for connection to the relay box; a vacuum inlet; a filtered-air inlet; and three signal strength adjustment valves.

*Manifold block.*—This block is attached to the cover plate and incorporates all necessary air passages, one labeled set screw for controlling the strength of the steering valve signal, and three labeled reversing valves which can be set to make servo cylinder action conform with any desired installation.

*Auxiliary manifold block.*—An auxiliary manifold block, containing air passages for the switching valve and the steering valve, is mounted on the main manifold block.

*Switching valve.*—The switching valve is mounted on the auxiliary manifold block. It directs air signals from either the directional gyro control or the steering valve to the transfer valves assembly.

*Steering valve.*—The steering valve is also mounted on the auxiliary manifold block and is actuated by a torque motor.

*Relays.*—A relay is mounted at one end on the steering valve. An arm, attached to the relay, operates the switching valve. Another relay is mounted on the auxiliary manifold block.

*Case.*—An air-tight, cast dural case encloses all of the parts of the stabilizing unit.

*Transfer valves assembly.*—The transfer valves assembly consists of three individual valves, one for each control (rudder, aileron and elevator), mounted together to comprise a single unit.

It has ports for system pressure and system return mounted at one end. Individual ports for servo lines are contained on one side of the unit mounted at each of the three valve mechanism bodies.

Lines to connect the system pressure and the servo pressure side of each individual valve are provided.

The valve assembly is covered by a sheet metal cover which is attached to the valve bodies. The cover contains a receptacle for connections from the six gyro pick-off signal air lines, two of which go to each individual valve. Two angles at the bottom of the unit are provided for mounting of the unit to a surface of the airplane.

*On-off control assembly.*—This assembly is comprised of a control handle, a hydraulic valve and two electric limit switches. The valve and switches are mounted on a sheet metal plate and in relation to each other to accomplish the desired results.

The on-off handle is a push-pull type of control mounted in the cockpit readily accessible to the operator. The hydraulic control valve is a 3-port cam-ball type valve which is actuated by the handle. One port connects to the hydraulic system pressure of the airplane, another to the system pressure side of the servos and transfer valves, and the third connects to the hydraulic return line of the airplane. The two switches are of the normally-open circuit type and are mounted one on each side of the hydraulic valve actuating lever. Movement of the hydraulic handle lever also actuates the switches in their proper function.

The moving contact terminal of both switches are connected to the 24-volt supply. The fixed contact of the switch is connected to one side of the exciting coil of a relay in the relay box and also to the normally-closed contact of a relay in the stabilizing unit. The fixed contact of a switch is connected to one side of the exciting coil of the relay in the relay box.

*Servo cylinder.*—There are three identical servo cylinders, one for each controlling surface.

Essentially a typical hydraulic double-acting cylinder in construction, the servo consists of an aluminum alloy body which contains two ports. One port is for connection to the hydraulic system pressure line, and the other is for connection to the servo control oil pressure line from the transfer valve.

The fixed end of the cylinder body contains a fitting in which is mounted a self-aligning bearing, the fitting being adjustable for position relative to the body.

Within the cylinder body is mounted a removable steel cylinder sleeve, and within the sleeve is mounted the movable piston rod. The piston rod is guided on its actuating end by a removable retainer which retains the cylinder sleeve and the piston rod. On the end of the piston rod is mounted a fitting containing a self-aligning bearing, the fitting being adjustable for position relative to the end of the piston rod.

Within the large portion of the servo body, adjacent to the ports, is mounted a sleeve. Within the sleeve is mounted a by-pass slide valve and spring with a valve stop and retainer.

*Controller.*—The controller consists of a case within which are mounted five electric switches, a control lever projecting through the case, and electrical receptacle mounted on the case to facilitate connection of the unit to other circuits.

The control lever actuates the five switches. Four switches are controlled by side-to-side and fore-and-aft motion of the lever, these switches controlling the amount of right and left bank and the amount of climb and dive. The fifth switch is controlled by a button located at the top of the lever. The button, known as the straight-course button, is actuated when it is desired to maintain straight flight.

*Relay box.*—The metal relay box houses two relays. On one side of the relay box are six electrical receptacles for connection to the airplane power supply and the other units of the automatic pilot. On top of the box there is mounted a ventilating cage which contains four center-tap resistors.

In this general description the limiting values given are, of course, typical and not essential.

It will be understood that the foregoing general description and the following detailed description as well are exemplary and explanatory of the invention but are not restrictive thereof.

Figure 1:
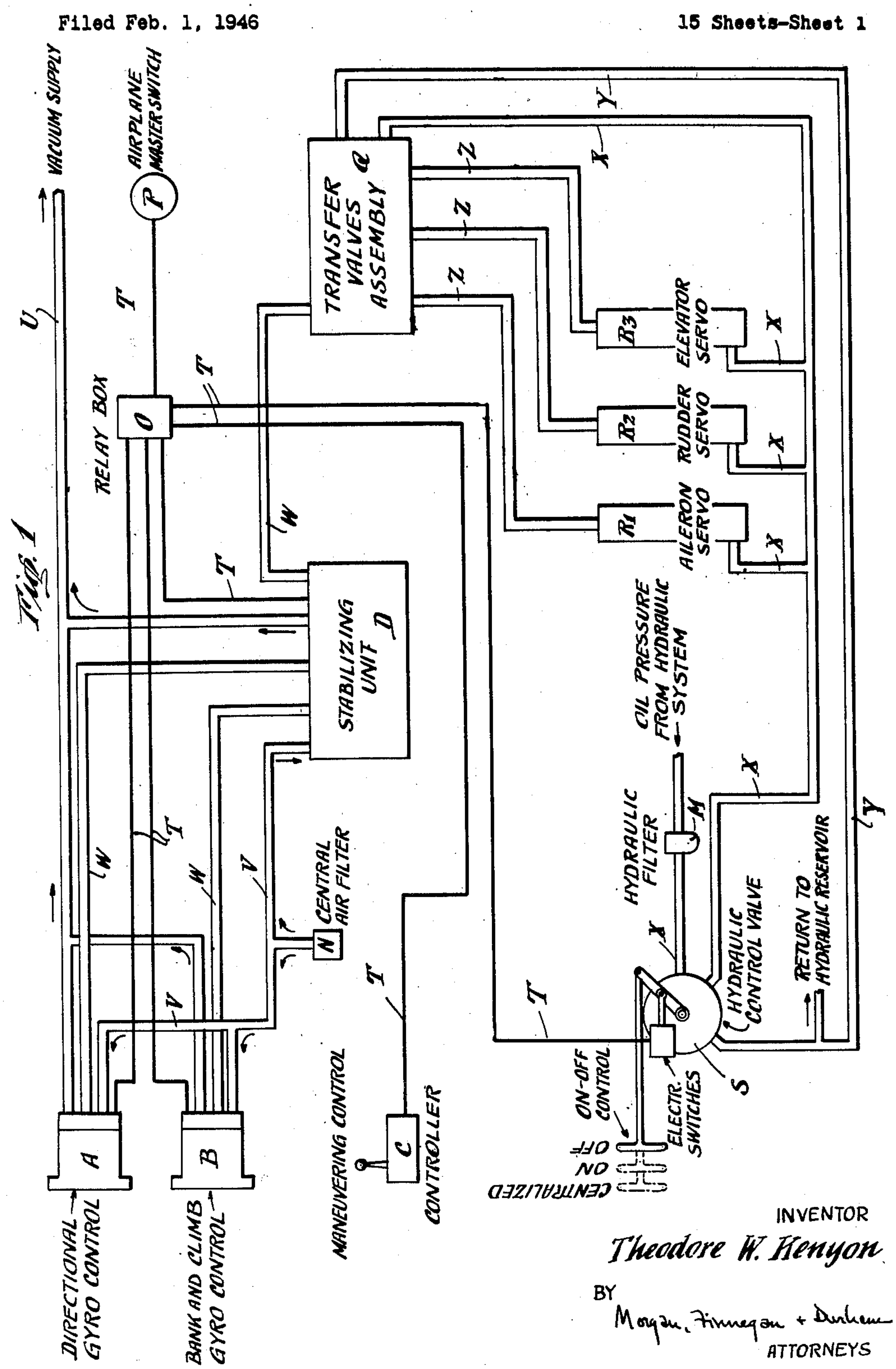
Figure 1 is a general schematic view showing the interrelation and interconnection of the principal units of the present embodiment of the invention, as applied to the control of a conventional aircraft adapted to be steered as to climb or dive, direction and bank.

Referring now in detail to the preferred and illustrative embodiment of the invention in which the several control units are adapted to create differential air pressure signals to be transformed into high pressure hydraulic motive forces, many of the parts being interconnected by electrical circuits, hydraulic connections and suction connections, Figure 1 shows a general schematic view of the entire installation. There is provided a suction driven directional gyroscope A of conventional construction provided with special attachments to produce differential air pressure signals in accordance with changes in course. An attitude gyroscope, or bank and climb instrument B, also of conventional costruction is provided with attachments by which changes in the rate of climb or bank produce air pressure signals. The gyroscopic instruments A and B are driven by and their signals powered by suction produced by air drawn in through line V and through a central air filter N under the influence of a suction pump connected to the main suction or vacuum line U.

Signals created by the response of the directional gyro control A and the attitude gyro control B are transmitted to a stabilizing unit D where these signals may be combined with other differential air pressure signals produced by one or more, preferably three rate gyros, F, G1, G2, responsive to movement of the airplane with respect to each of its three axes of movement, and one or more of the rate gyros preferably being responsive to changes in the rate of angular movement of the airplane about one or more of its axes.

Means are also provided for manually controlling the signals created by the various units so that the pilot may maneuver the airplane at will, and for this purpose there is provided a manual control C whereby the pilot may cause climb or dive signals to be created or the plane may be banked to the right or left at will. The manual control C also includes means whereby the pilot at will may render effective the stabilizing unit D and the controls A and B so that they will continue to hold the airplane on the course which has been established either manually or under control of the instruments A and B, thereby enabling the pilot at once to keep the plane flying straight ahead on a level course, in a right or left hand ascending or decending spiral, or a straight ahead climb or dive, the precise maneuver depending on the position of the airplane at the time the stabilizing unit and controls A and B are rendered effective.

A master switch P which is preferably the master switch of the airplane is provided by which the instrument is turned on and it is ready for operation as soon as suction has been developed in the line U and the gyroscopes have attained full speed. A second control S is provided by which the automatic pilot is turned on or shut off, this control controlling not only the electrical connections in the apparatus but also supply of fluid under hydraulic pressure to be supplied to the hydraulic motors R1, R2, R3 connected for operation of the control surfaces of the airplane.

The valve S also preferably provides for a centralized position to which it may be temporarily moved by the pilot and in which position all of the control units are so positioned that the airplane will assume level, straight flight on an arbitrary heading, thereby enabling a pilot who is wounded or otherwise incapacitated, or possibly only confused, to operate a single means which will avoid all normal hazards.

Hydraulic power for the operation of the hydraulic motors R1, R2 and R3 for the control surfaces is provided by an oil pump developing oil pressure of many hundred, and preferably about 1000 to 3000 p. s. i., the oil being supplied through a hydraulic filter M to the hydraulic lines X and returned to an oil sump or reservoir through the hydraulic line Y.

Signals from the stabilizing unit, whether produced by the directional gyro A, the attitude gyro B, the manual controller C, or by the rate gyros F, G1 or G2, or by a combined action of some or all of these controls, are transferred as differential air pressure signals through the signal lines W to a transfer valve assembly Q by which the small air pressure of the signal, often only one inch mercury pressure or less, is used to effect the control of the hydraulic pressure so that a motive force of many hundred pounds may be developed and accurately controlled thereby. The transfer valve assembly Q is connected with the hydraulic servomotors R1, R2 and R3 by means of the hydraulic control lines Z, one such line leading to each of the hydraulic motors which are preferably of the differential pressure type such as is disclosed in my prior application Serial No. 637,059 filed December 22, 1945, now Patent No. 2,598,180, patented May 27, 1952.

The various electrical parts of the automatic pilot are for the most part interconnected through a single relay box O through which all of the electrical control signals are passed as they go to the stabilizing unit D, the circuits being designated by the general symbol T.

Figure 2 of the drawings is a more detailed schematic view showing the principal elements of the stabilizing unit D, all enclosed within an airtight housing and connected by the pipe U to the vacuum pump, by the pipe V to the filtered air supply, by two pipes W1 and W2 to the directional gyro A and by four pipes W3, W4, W5, and W6 to the attitude gyro B, and also by the six pipes W7, W8, W9, W10, W11 and W12 to the three transfer valves in the transfer valve assembly Q. The stabilizing unit D includes the rate gyro F, the derivative rate gyros G1 and G2, the synchronizing means E1, E2 and E3, the steering valve J, the switching valve K, a reversing valve L controlling the signals for each control surface of the airplane, and various adjustable bleeds H for regulating the sensitivity or response of the several portions of the stabilizing unit.

Each of the derivative rate gyros G1 and G2 is preferably of the form shown in my prior application Serial No. 637,058 filed December 22, 1945, now Patent No. 2,569,676, patented October 2, 1951, G1 being mounted with its spin axis parallel to the wing span, that is normal to the longitudinal axis of the airplane, and serves to control the banking of the airplane, while the derivative rate gyro G2 is mounted with its spin axis parallel to the direction of travel of the airplane or the longitudinal axis of the airplane. The rudder rate gyro F is conveniently of the simple rate gyro type, similar to G1 but omitting the elements which modify the rate response and produce the derivative thereof, and is mounted so that its spin and gimbal axes are normally horizontal as the plane flies a level course.

The stabilizing unit also includes the three synchronizing means E1, E2 and E3, E1 being actuated by the directional gyro A, while E2 is actuated by climb or dive signals and E3 is actuated by right or left bank signals received from the attitude gyro B. The synchronizing means serve to receive signals from the control units A and B and to cause electrical energy to be supplied controlled as to time and polarity to the motors incorporated in the control units A and B so that the pick off from these units are always ready to be placed into operation whenever the pilot so desires.

The steering valve J forming part of the stabilizing unit D, as does the switching valve K, serves to switch the rudder signal of the stabilizing unit from manual to automatic operation at the will of the pilot and automatically as the on-off control S is actuated.

Three reversing valves L1, L2, and L3 are included within the stabilizing unit so that the same unit may be installed in different airplanes. The function of each of these reversing valves is to reverse the sense of the signal transmitted from the stabilizing unit to the transfer valve assembly so as to reverse the operation of the corresponding servo-hydraulic motor. Thus, if a servomotor is mounted so as to require a signal of one sense to cause the elevators to be raised and this actuation of the control surface is caused by a pushing operation of the servomotor, the same control action may be obtained from the same signal in another airplane which requires that the control surface be actuated by the pulling action of the servomotor.

The derivative rate gyros G1 and G2 are preferably similar to those of my prior application and the intake ports 33 of the valves thereof are adjustably regulated by means of the adjustable bleed screws H which serve to restrict the intake ports to the desired extent, these bleed ports being located within the stabilizing unit housing so that only filtered air having passed through the main air filter N and entered the casing through the pipe V is admitted to the valve structure.

The rate gyro F preferably corresponds to the structure of my prior application, except that illustratively and optionally, the derivative means are omitted and the gyro precession directly actuates the control valve. Thus in my prior application, the parts 51, 56, 60, 61, 62, 65, 67, and 68 are omitted and the arm 50 is directly and rigidly connected to the lever 25 for movement of the valve arm 46.

The stabilizing unit D receives signals from directional gyro A through lines W1 and W2, and receives banking signals from the attitude gyro control unit B through lines W3 and W4, while it receives elevator signals from the unit B through lines W5 and W6. Signals are transmitted from the stabilizing unit D to the transfer valves through the lines W7 and W8 which control transfer valve R3, through lines W9 and W10 for the transfer valve R2 and through lines W11 and W12 for the transfer valves R1, the intensity of these signals being controlled by the bleed ports H which bridge the pairs of control lines and bleed air to them from the interior of the casing of stabilizing unit D, the more air bled the less intense the signal.

The switching valve serves to isolate signals from the control units A and B so that when the airplane is being subject to manual control through the controller C, the signals from the automatic control units are ineffective to actuate the transfer valves.

The stabilizing unit D thus receives automatically produced signals from the units A and B, combines these with the signals produced by the units F, G1 and G2, all of which are automatically produced signals indicating the deviations of the airplane from the normal course, and transmits these signals to transfer valves by which the control surfaces of the airplane are controlled so as to maintain a normal course of flight. Further, manually imposed deviations may be imposed on the automatically maintained course at will.

Figures 3 to 7 of the drawings show schematic and structural views of the directional gyro control unit A.

Figure 4:
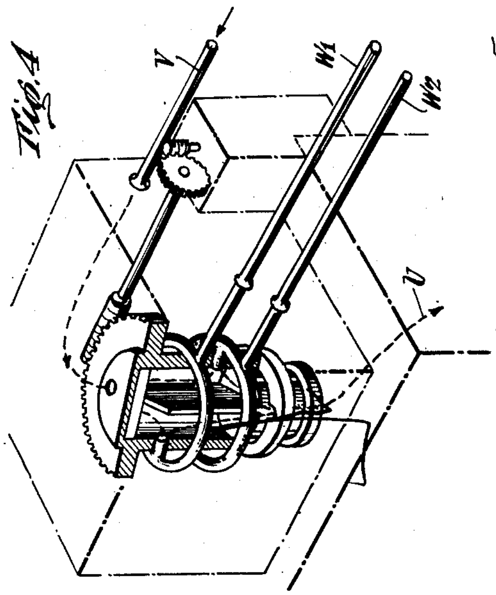
Figure 4 is a fragmentary view of the elements shown in Figure 3, but showing the parts in a neutral or straight-ahead course position.
Figure 5:
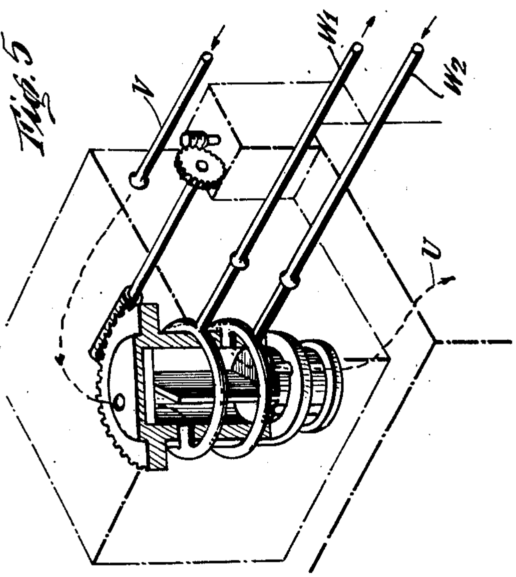
Figure 5 is a similar view showing the parts arranged to produce a signal corresponding to a heading to the left of the previous or normal course of the airplane.
Figure 3:
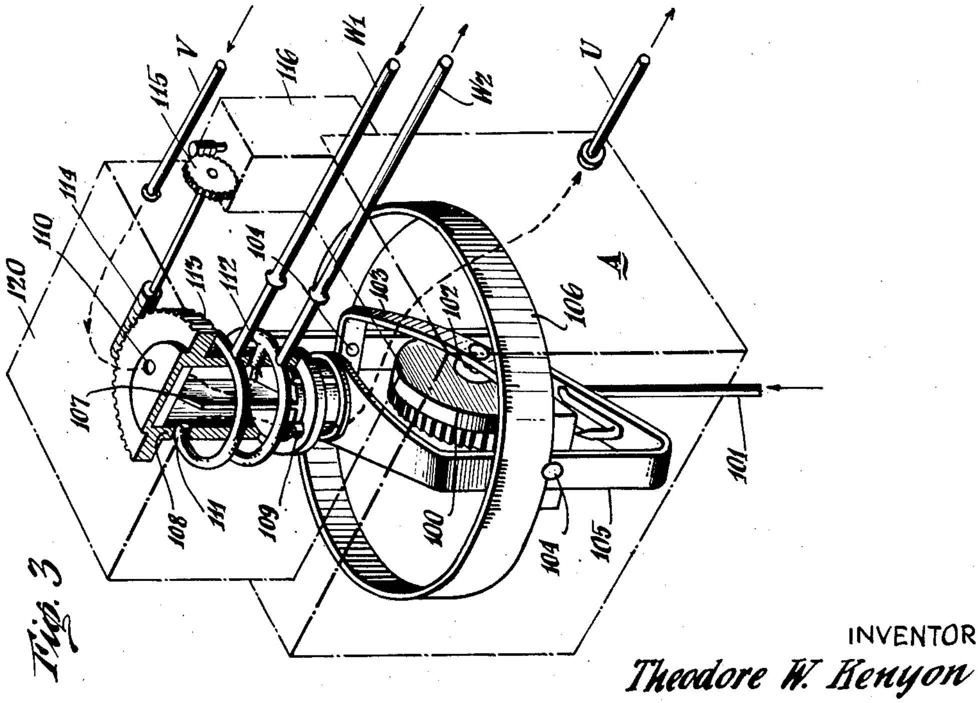
Figure 3 is a diagrammatic view showing a standard form of directional gyroscopic flight instrument with suitable additions, in accordance with the present invention, adapting it to create differential air pressure signals in response to changes in the course or direction of flight of the airplane.
Figure 6:
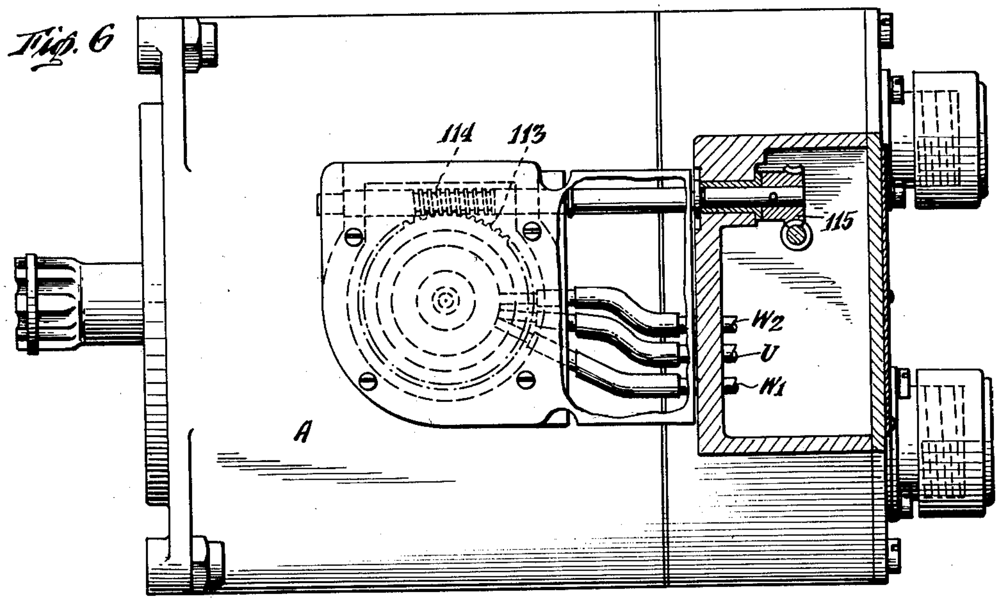
Figure 6 is a top plan view, with many parts omitted, of the directional gyroscopic instrument shown in Figures 3 to 5.
Figure 7:
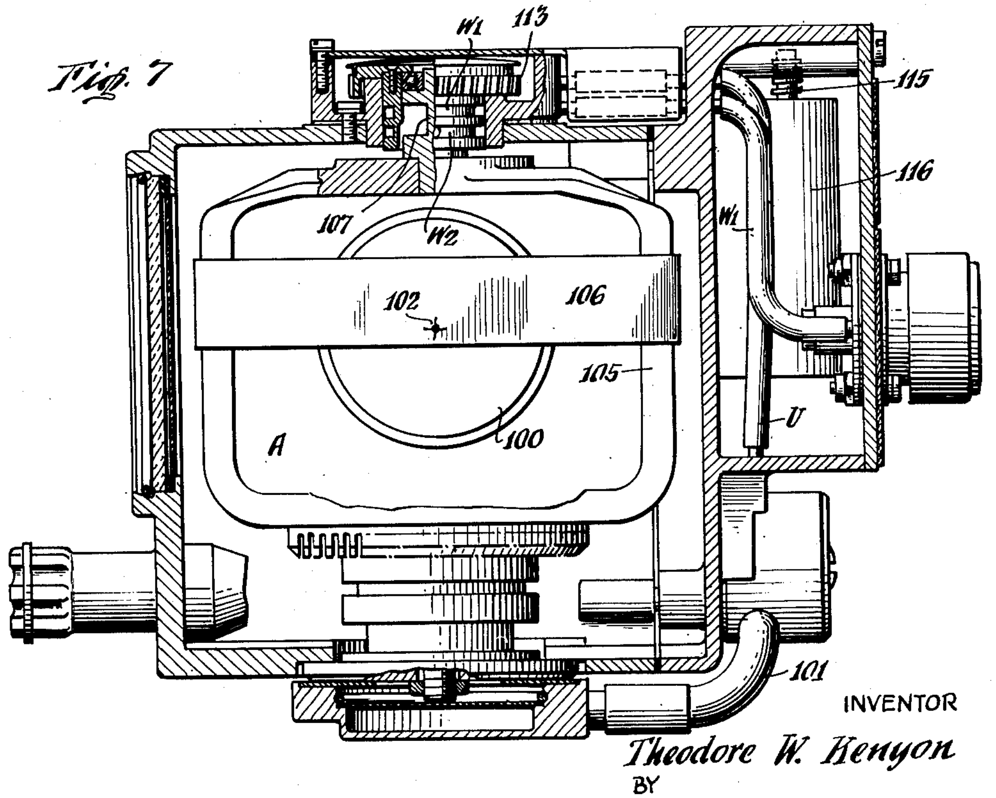
Figure 7 is a side view, with parts shown in section and other parts broken away, of the instrument and control device shown in Figure 6.

Figure 3 shows the directional gyro control unit as the airplane has turned to the right of its normal course, Figure 4 is a similar view with the airplane on a straight course, and Figure 5 shows the instrument as the airplane has turned to the left of its normal course. Figures 6 and 7 are top and side views respectively of the directional gyro control intrument in its constructional form, with many parts omitted, and showing the mechanicl form of the valve units.

In the directional control unit A, there is provided a gyroscopic rotor 100 rotatable on an axis 102 and driven by air supplied through the pipe 101. Axis 102 is suitably supported in a frame 103 which is pivotally mounted in bearings 104 in the frame 105 which is mounted for oscillation and rotation about a normally vertical axis. The indicator ring 106 carried by the frame 105 serves to show the heading of the airplane, and thus the unit serves not only as a control unit but also as a flight instrument.

Rigidly mounted with the frame 105 and rotatable therewith, as the heading of the airplane is changed, is a vane or valve member 107 closely fitted within the valve chamber 108 which is normally stationary with reference to the airplane and the casing of the unit A. The valve casing 108 is provided with the inlet port 110, the diametrically spaced outlet 109 connected to line U and the suction pump. Valve chamber 108 is also formed with circumferentially apertured, diametrically spaced ports 111 and 112 which are preferably spaced about 90° from the ports 109, 110. The vane 107 is very slightly smaller in thickness than the diameter of the ports 109 and 110 and when centrally positioned allows an equal but small quantity of air to enter on each side of it and to be withdrawn through the port 109, thereby establishing equal negative pressures in the lines W1 and W2, through ports 111 and 112, a condition shown by Figure 4.

In the position shown in Figure 3, the full suction from line U is applied through port 109 to the port 111, while the filtered air flowing through line V enters port 110 and is communicated to port 112 and line W2 thereby establishing a lower pressure in line W1 than in line W2 so that a positive signal is created. In Figure 5, the reverse is true and the line W1 has a higher pressure than line W2. In Figure 4, the vane 107 is centralized with respect to ports 109 and 110 so that the flow of air is equal through the two halves of the chamber 108 and an equal pressure is established in the lines W1 and W2, both being somewhat below atmospheric pressure.

As shown in Figures 6 and 7, the lines W1 and W2 preferably communicate with annular grooves formed in the valve chamber member 108 surrounding and fitted to the vane 107.

Means are also provided for rotating the chamber 108 with its ports 109 and 110 so that the centralized position of the chamber may be changed for any desired heading of the airplane. For this purpose, chamber 108 is formed integrally with a gear 113 meshing with a worm 114 which is driven by reduction gearing 115 from the reversible motor 116. Chamber 108 may be rotated without limit by motor 116 in either direction and thus may be accurately positioned for any heading, and when so positioned establishes a new neutral position for the vane 107, and so long as the airplane continues on the same course, the differential air pressure signal in the lines W1 and W2 is equal.

The directional gyro control unit, is preferably mounted on the front panel of the cockpit, visible to the pilot, so that, with its ring 106, it serves as a navigational instrument, and the spin axis of the rotor is such that in normal unbanked flight, the rotor spin axis 102 is horizontal, and normal to the direction of travel of the airplane; thus the gyroscope responds to any change in course of the airplane to the right or left such as might result from a sudden gust blowing the airplane from its intended heading.

Likewise, the attitude gyro control unit B is provided with the usual face which includes an image of an airplane which is displaced with reference to the airplane as the airplane deviates in space from a level, unbanked flight. Illustratively the attitude gyro consists of a standard gyro horizon indicator, to which various elements have been added so that it may create and transmit signals to the stabilizing unit D, which signals are in accordance with and selectively proportional to the displacement of the airplane with reference to a normally vertical axis, thereby indicating any deviation of the longitudinal and transverse axes from a normal horizontal plane. The attitude gyro is also provided with two reversible motors whereby the pick-offs or signal producing means, corresponding to climb or dive and right or left bank, may be neutralized or synchronized thereby causing the airplane to fly in any desired attitude.

Figure 8:
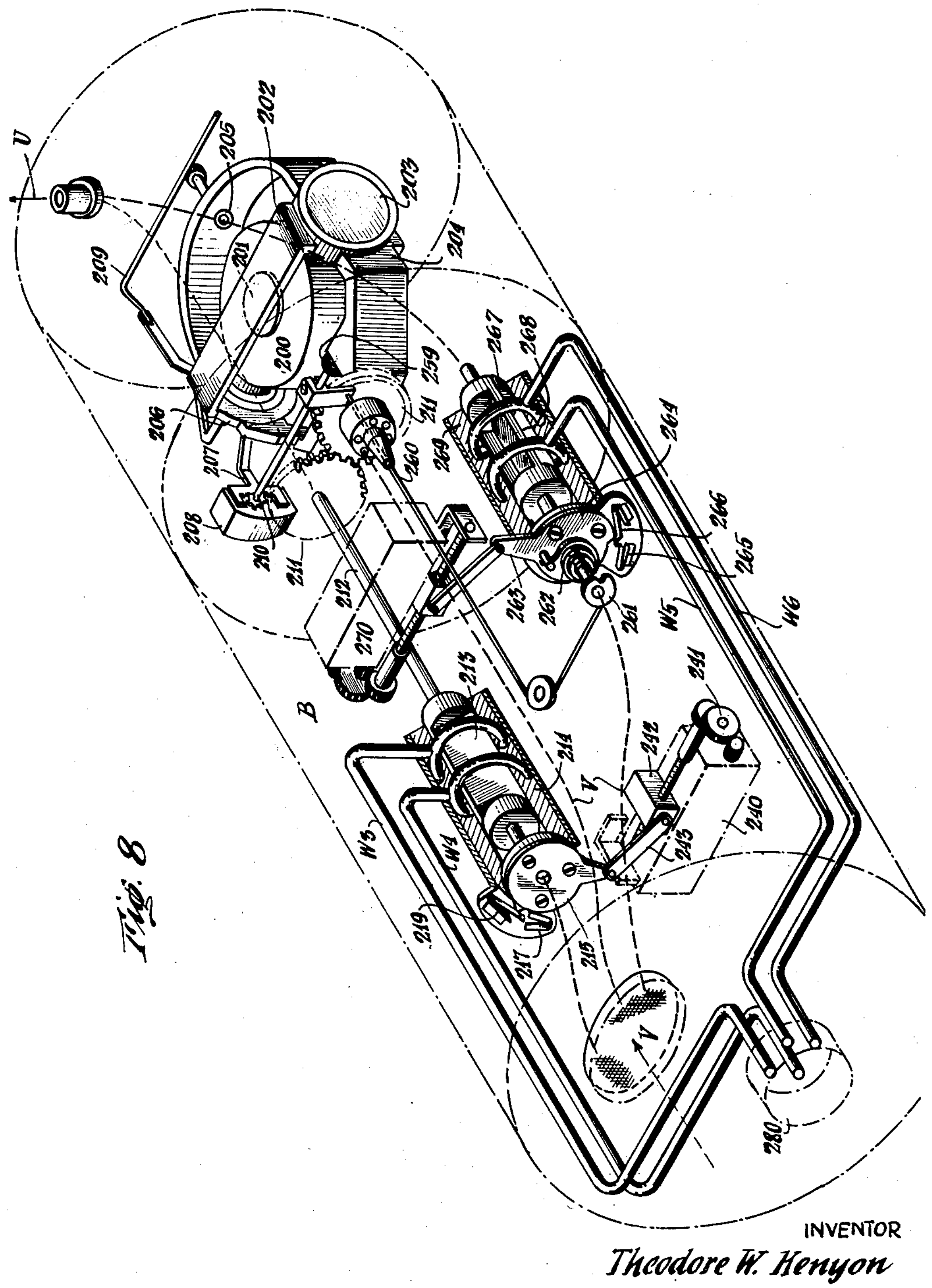
Figure 8 is a diagrammatic view of a conventional attitude gyroscopic instrument modified by the addition of various attachments in accordance with the present invention so that changes in bank or climb of the aircraft produce differential air pressure signals which may be used to control the bank and climb of the airplane.

The details of the attitude gyro control unit, or bank and climb unit B, are shown in Figure 8, the various elements of this unit being a modification of a standard bank and climb instrument.

As embodied, rotor 200 is driven by means of the conventional air jet and is mounted to turn about its spin axis 201, in a frame 202 which is pivoted on bearings 203 mounted in frame 204 which is pivoted in bearings 205 thereby providing a gimbal mounting for the gyro rotor. The instrument is mounted so that it is directly in front of the pilot on the instrument panel and in normal position the axis of the rotor 200 is vertical, so that any banking of the airplane or change in climb or dive from level flight causes the rotor axis to be shifted accordingly. The frame 202 in which the rotor is journalled is formed with an external member 206 which terminates in an arm 207 having a rack and counterweight 208 at its rearward end which meshes with a gear on shaft 210 so that shaft 210 is turned proportionally to the precession of the gyroscope rotor. Arm 207 is also connected through a cam mechanism, in the usual manner, to actuate the horizon indicator 209 which is visible to the pilot.

The frame 202 is mounted in frame 204 which is pivoted for movement about a horizontal forward axis extending through pivots 205 and allows the frame 204 to oscillate to the right or left as the airplane is banked. Gear 211 carried on frame 204 meshes with gear 211 which is connected to valve member 213, rotatable within the valve body 214. Air is drawn through the vent V from the central air filter, by influence of the suction exerted by line U and is made effective by reason of the air-tight housing surrounding the instrument B. This valve is generally similar to the valve in the unit A and comprises the valve 213 which is housed within the valve body 214 and serves to differentially apply suction from the line U through the hollow valve stem 212 to the port to line W3 or W4, while atmospheric air is applied through the central portion of switch 215 to supply air to the other line W3 or W4, depending on the direction of bank of the airplane.

As the airplane changes from normal level flight to a climb or dive, rack 207 rotates shaft 210 and arm 259 attached thereto. Rotation of arm 259 causes filament 260 to unwind or wind on drum 261 under the influence of spring 262, at the same time controlling the position of vane 268 so that the suction applied to valve 267 from line U draws air through the hollow stem of drum 261 and creates a differential air pressure signal in the lines W5 and W6 whenever the airplane is not flying on a normal level or unbanked course.

Switch actuator 215 moves with vane 213, and switch actuator 264 moves with vane 268. The details of these switches are shown in Figures 9, 10 and 10*a*.

The valve controlling the signals through line W3 and W4 comprises the vane 213 rotatably mounted by means of the antifriction bearings 226 in the valve sleeve 214 which in turn is rotatable in the valve body 227. The valve sleeve and vane are held against axial movement by means of the plate 228 anchored to one end of the valve body 227, while the other end of the valve is provided with a plate 229 which together with the switch cam 215 are screw fastened to the end of the valve sleeve 214 and are held against axial movement by means of the thrust plate 225 fast to the end of the valve body 227. Valve sleeve 214 carries the various valve ports, while the valve body 227 is in communication therewith by means of the annular grooves formed in the exterior of the valve sleeve.

Switch cam 215 includes an arm 220 and a raised portion 218. In the position shown in Figure 9, the portion 218 allows spring contact 217 to remain out of contact with the spring contact 219, while clockwise rotation of the cam disc 215 will cause contacts 217 and 219 to be closed. Cam 215 may be moved by arm 220 under control of the reversible motor 240 which drives screw threaded block, 242, Fig. 8, through reduction gearing 241 to actuate pitman link 243 by which the block 242 drives arm 220 thereby controlling the angular position of the cam 215 at which the contacts are opened or closed.

The valve for the other function of the attitude gyro is generally similar and includes the valve vane 268 between valve discs 267 and rotatable within the valve sleeve 269 carrying the valve ports, and fast to the valve or switch cam discs 264 which serves to open or close the contacts 265, 266 as the disc 264 is turned by arm 263 actuated from reversible motor 270. Vane 268 is fast to the valve shaft and pulley drum 261, but is relatively rotatable with reference to the switch disc 264, although it is normally centralized by means of the spiral spring 262, so that in its normal position an equal suction is applied to the lines W5 and W6.

As previously referred to, the stabilizing unit D includes three rate gyroscopes each capable of producing differential air pressure signals, and these rate gyros are illustratively of the kind shown and described in my prior application Serial No. 637,058, now Patent No. 2,569,676, although in many instances and here shown the rudder rate gyro F may omit the elements which transform the rate response into a response actuated by a change in the rate of angular movement and thus it is not a derivative rate gyro. The rate gyro G1 responsive to the rate of banking of the airplane and any change in this rate, and the rate gyro G2 responsive to the rate of climb or dive of the airplane as well as any change in the rate of climb or dive are preferably exactly in accordance with my said prior application, the aileron rate gyro G1 being mounted with its rotor axis horizontally transverse of the airplane, while the elevator rate gyro G2 is mounted with its rotor axis parallel to the longitudinal axis of the plane. The non-derivative rate gyro F is mounted with its rotor axis vertical.

As embodied in my prior application, the rate gyro control units or signal producing means G1 and G2 each comprises an element which normally has a fixed angular position in one plane in space, and is illustratively shown as gyroscope rotor 10, Fig. 11, the periphery of which is formed with buckets 11 onto which a stream of air impinges from the nozzle 12 thereby driving the gyroscope rotor. The rotor 10 is mounted by a shaft in suitable antifriction bearings 13 carried in frame 14, which frame is pivotally mounted by shafts 15 and 16 providing a pivot axis at right angles to the gyroscope rotor axis. Shafts 15 and 16 are journalled in the plates 17 and 18 forming the end-walls of a housing 20 which is preferably airtight and is provided with an outlet port 21 through which air is exhausted to cause the flow of air through the nozzle 12.

Gyroscope rotor 10 may have its axis parallel to the line of flight or movement of the aircraft or other vessel, or at right angles thereto and in a horizontal plane or in a vertical plane or may otherwise be positioned as desired. In most instances, three separate gyroscope rotor elements each having an axis with a fixed but different angular position in space will be provided on each aircraft or vessel, the axes corresponding to the three different axes about which an aircraft may move.

Within the housing 20, and fixed to the end-wall 17 thereof is a stop 22 having depending fingers 23 adapted to contact with a portion of the frame 14 so as to limit precessional movement of the gyroscope.

Means are provided permitting the gyroscope to have limited free precessional movement, if desired, and for resiliently returning the gyroscope to a normal position in case it has precessed beyond its free precessional limit. As embodied, shaft 15 is provided with a radially extending arm 25 from which projects a radial leaf spring 26, its free end being positioned between the stop screws 27 threaded in supports 28 and adjustable toward and from each other so as to allow a variable degree of free precessional movement of the gyroscope, and also to provide for the centralizing adjustment of the normal position of the gyroscope.

On angular movement of the aircraft, the gyroscope will tend to maintain its spin axis in a constant position with respect to the earth, and will therefore precess with respect to the aircraft. The rate of precession and the magnitude of the precessional torque will be directly proportional to the rate of turn of the aircraft so long as the gyroscope is unrestrained. However, if a restraint is imposed upon the gyroscope, the resultant torque will be equal to the difference between the precessional torque and the torque exerted by the restraint. The rate of precession of the gyroscope will be proportional to this resultant torque. The precession of the gyroscope will cause the arm 25 to rotate with respect to the aircraft, first without restraint if desired, and then subject to the resilient force exerted by the spring 26. During the period of unrestrained precession the spin axis of the gyroscope will maintain a constant position with respect to the earth, the rate of precession being proportional to the rate of turn of the aircraft. However, after the restraining torque is imposed, the rate of precession although still a function of the rate of turn of the aircraft will be of a smaller magnitude than the latter. As a result the spin axis of the gyroscope will be gradually displaced from its original angular position with respect to the earth. Such displacement will continue until the restraining torque and precessional torque are equal and the gyro will then be held in its displaced position.

Means are also provided for creating a signal which preferably varies not only in intensity but also varies in sense, and this signal may conveniently be a change in air pressure; an increase in pressure representing one direction of movement with respect to the fixed element, while a decrease in pressure represents the other direction of movement with respect to the fixed element, the intensity of the signal in each case being controlled by the rate at which the angular movement with respect to the fixed element is taking place.

As embodied, there is provided an air valve 30 comprising a cylindrical chamber having an eduction port 31 through which air may be withdrawn from the diametrically spaced inlet port 34 or either or both of the signal ports 32 and 33, which ports are preferably equally spaced from the ports 31 and 34, and may be of the same size. Within the casing 30, and closely fitted thereto, yet having sufficient clearance so as to be freely movable with a minimum of friction, is provided a valve member 35 which comprises upper and lower cylindrical portions 36, 37 connected by means of a narrow diametrically extending web 38, the width of the edge of web 38 being almost as great as the diameter of the eduction and inlet ports 31 and 34, so that the web 38 never completely closes ports 31 and 34.

Means are provided for yieldably returning the valve member 35 to a normal central position and for this purpose a hair spring 40 is made fast to shaft 41 which extends from the valve member 35, the other end of the hair spring being anchored in post 42 carried by the housing 30. Thus the valve member 35 is normally returned to a position where the web 38 substantially closes ports 31 and 34 leaving equal arcuate openings at either side of the web 38 so that air continually is withdrawn in equal quantities through the ports 32 and 33.

The other end of the valve member 35 is provided with a shaft 45 to which is connected an arm 46 having a counter balance 47 so that the arm and valve member 35 are in static balance for all positions. Arm 46 is preferably so located that with valve member 35 in its normal position of rest, arm 46 extends directly toward the gyroscope precessional axis 15.

Means are provided for interconnecting the gyroscope frame and the valve member 35 so that extreme precessional movement of the gyroscope in either direction causes a positive movement of the valve member in one direction or the other, dependent upon the direction of precession. For this purpose a link 50 is pivotally connected by pivot screw 51 to an arm 25, and at its other end link 50 is forked, as at 52 to fit over a pin 53 carried by arm 46. Lever 50 is provided with an aperture 55 through which passes a pin 56 carried by arm 25 at a point intermediate the shaft 15 and pivot screw 51, the clearance between aperture 55 and pin 56 providing limited free movement of the lever 50 with reference to the arm 25. As the gyroscope precesses in a clockwise direction, valve member 38 is thereby turned in a counterclockwise direction to establish an air signal at port 32, and a suction signal at port 33, while similar air and vacuum signals would be established at ports 33 and 32 respectively by the opposite movement of the parts. Thus on an extreme angular rate of the aircraft with reference to the restrained gyroscope, a signal is established at port 32 or 33 corresponding to the rate of angular turning of the vehicle in one plane.

Means are also provided for controlling the valve member 38 to establish a signal dependent on the rate of angular acceleration in one plane of a vehicle as it moves with respect to the gyroscope spin axis, and for this purpose yieldable means, preferably having a variable but slow response, are actively connected to control the movement of the valve member 38 on any precessional movement of the gyroscope. For this purpose there is provided a dash pot 60 comprising a cylinder open at one end in which slides a closely fitted piston 61, said piston having a link 62 by which it is pivotally connected to an intermediate portion of lever 50, the pivot pin 63 preferably alined with the precessional axis or shaft 15.

Dash pot 60 is mounted by bracket 65 on plate 66 to which the gyroscope casing 20 is fixed. At the closed end, the cylinder is provided with a bleed port 67 which is regulably restricted by needle valve screw 68 so that the flow of air into and out of the dash pot chamber may be regulated at will. The dash pot thus provides a slowly yieldable fulcrum for the lever 50 to cause displacement of the valve member 38 on any precessional movement of the gyroscope, and causing a considerable signal to be established, which signal decays unless further precessional movement of the gyroscope takes place, due to the resilient pressure exerted by hair spring 40 through arm 46 on the end 52 of lever 50, thereby causing piston 61 to assume a new position. However, when the precessional torque ceases to increase, spring 26 holds the gyroscope in its displaced position, causing a reversal of the lever 50 and valve member 35, at which time the hair spring 40 acts tending to move piston 61 towards its original position.

Means are also provided for moving the gyroscope from the position it normally tends to have, to cause a momentary change in the signal produced by the signal-producing means, either decreasing, increasing or reversing the signal otherwise produced by the relative angular movement of the aircraft and gyroscope. As embodied a circuit permanent magnet 73 is mounted near the end of shaft 16, magnet 73 having its poles diametrically spaced from each other, and magnet 73 is positioned between pole pieces 74 and 75 of electromagnet 70, the poles of magnet 73 being normally positioned at right angles to the field created by the electromagnet 70. As magnet 70 is energized, a rotational effort is thus exerted on the magnet disc 73 and on the gyroscope, while a reversal of the current flowing through the winding of magnet 70 causes a reverse movement of the magnet disc 73.

In normal straight flight considering the instrument as having the gyro spin axis parallel to the line of flight and the precessional axis substantially vertical:

Spring 26 has returned the gyroscope to normal central position, dash pot piston 61 is centralized, lever 50 lies with its pivot 63 over shaft 15 and valve 30 is in its neutral position with air being drawn through eduction port 31 and equally through ports 32 and 33 creating equal signals in the two lines connected with these two ports as port 34 is substantially closed.

Figures 13 to 18 of the accompanying drawings show certain of the instrument parts as they react to different rates of turning of the aircraft or other vehicle.

Figures 13, 14, 15:
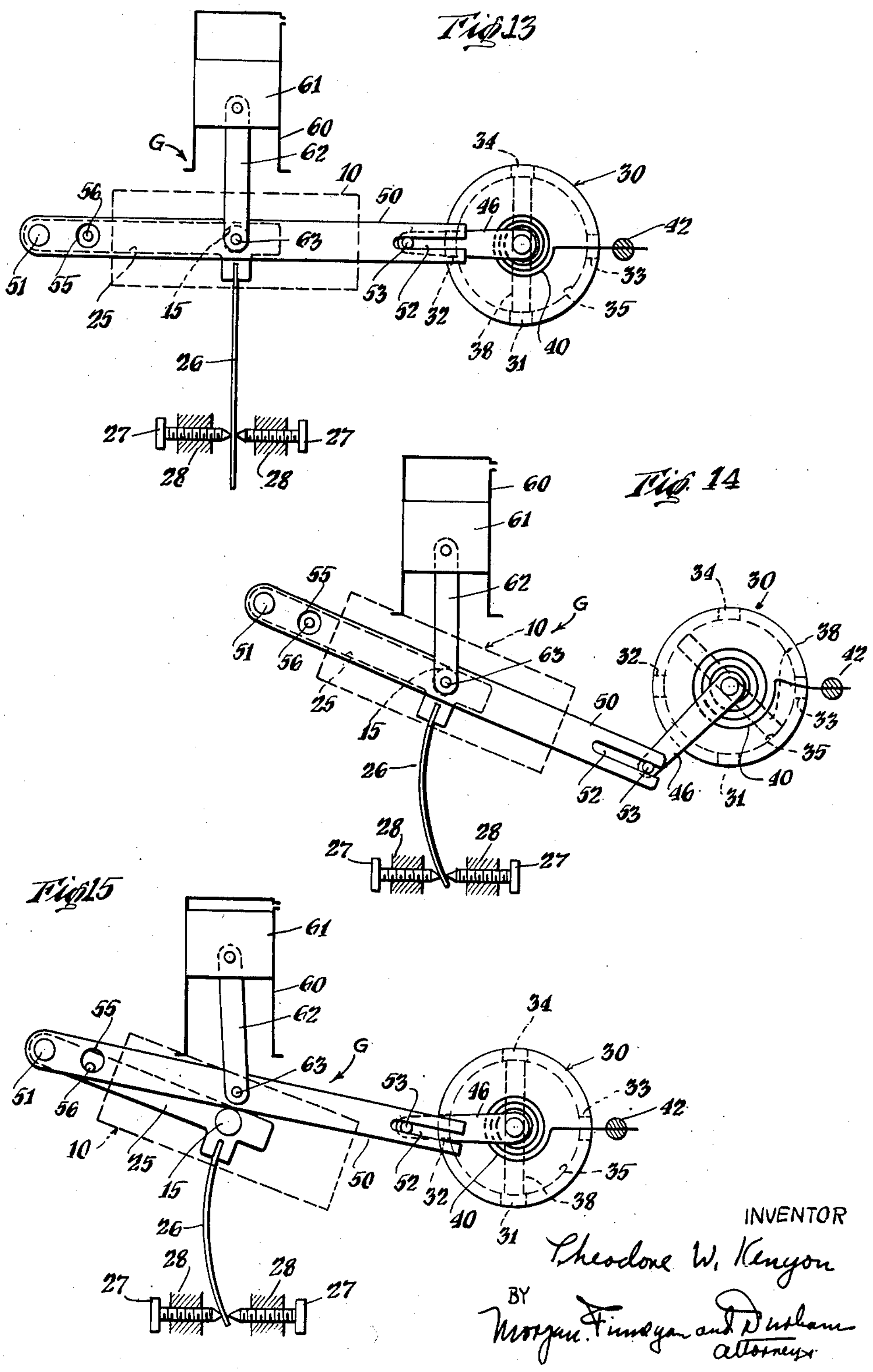

In Figure 13, the aircraft is maintaining a steady straight course, the gyroscope spin axis is in its normal position, which may be parallel to the course or at right angles thereto. In this position, all parts are centralized and equal suction is created at ports 32 and 33, so that no signal is established at either port, or it may be considered as establishing equal signals at the two ports.

Figure 14 shows the position of the same parts when the vehicle is making a left turn and the angular acceleration in turning is quite large, as at the beginning of a sharp left turn. Dash pot piston 61 tends to move only very slowly from its centralized position, the gyroscope 10 tends to remain parallel to its original spin axis, but its free movement is resisted by spring 26 and the gyroscope will assume a position where its precessional torque is balanced by the spring 26. Pivot 51 causes lever 50 to be swung to swing valve member 38 so as to establish a free path between the suction port 31 and signal port 32, and between signal port 33 and the air port 34, thereby causing full application of the suction to port 32 and simultaneously allowing air to flow to the port 33, thereby establishing the maximum differential pressure between the ports 32 and 33.

Figure 15 shows the instrument as the vehicle continues to turn to the left but at a constant rate of turning. In this figure, the gyroscope axis is still displaced in accordance with the rate of turning of the vehicle, but dash pot piston 61 has moved under the influence of the hair spring 40, and valve member 38 has been restored to its central position thereby equalizing the signal at ports 32 and 33.

Figures 16, 17, 18:
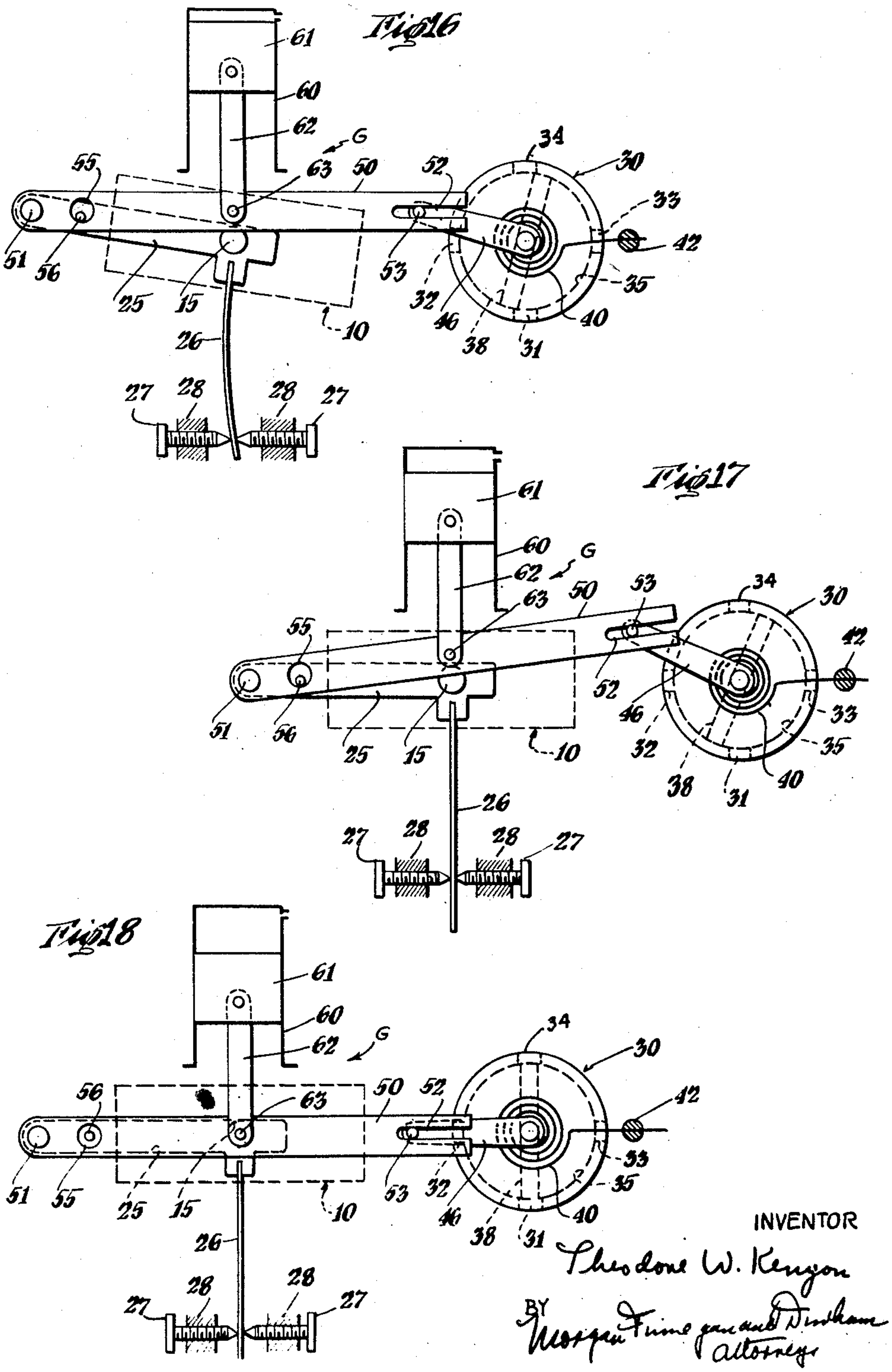

Figure 16 illustrates the position of the parts as rate of turning decelerates. The gyroscope is not displaced so far to the right, showing that the rate of turning of the vehicle to the left has been reduced as the precessional torque is less. This movement causes valve member 38 to be swung clockwise to a slight extent thereby increasing the suction applied to port 33 and increasing the flow of air to port 32.

Figure 17 shows the result of further deceleration of the rate of turning of the vehicle to a point where the turn is completely stopped. When stopped, the gyroscope axis is parallel to the course of the vehicle, dash pot piston 61 will slowly return to its central position under the influence of hair spring 40, but the deceleration of the rate of turning has increased the suction signal applied to port 33 and the flow of air to port 32.

As the vehicle reaches its steady straight course, gyroscope 10 remains in its parallel position, while dash pot piston 61 yields under the influence of the hair spring 40 until valve element 38 is centralized with respect to ports 32 and 33, thereby allowing equal suction to be applied to both ports 32 and 33, the same position as is shown in Figure 13.

If the vehicle is turned to the right, instead of to the left, the operation of the parts of the instrument are reversed from those just described.

While the movements have been described with reference to a straight course, and with respect to a gyroscope having its axis normally parallel thereto, it will be understood that similar movements will take place if the gyroscope axis is parallel to either of the other two axes of turning of an aircraft, and that the responses to such turning will be similar.

In addition to the foregoing movements of the valve under different conditions as created by the angular movement of the aircraft in flight, means are provided for momentarily angularly moving the gyroscope with respect to a spatially fixed line, and this is accompanied by energizing the electromagnet 70 so that the armature 73 tends to move in one direction or the other, thereby imparting a momentary torque to the precessional axis of the gyroscope.

Signals from the signal generating gyroscope and their associated air valves may be variously employed, such as for the actuation of indicating instruments, or the direct or indirect control of control surfaces of the aircraft. Thus, exemplarily, one control device may control the rudder of an airplane, another the ailerons and a third the elevators whereby flight in any altitude may be controlled or maintained.

The rate gyro F is similar except that the dash pot 60, 61, 62 is omitted and the triple pivoted lever 25, 51, 50, 55, 56, 63 is replaced by a rigid arm directly actuating the valve arm or lever 46.

The three rate gyros F, G1 and G2 are mounted within the airtight casing of the unit D so that suction is applied to all of the pipes 21 by the pipe U and air is admitted to each of the rate gyro units through pipes 33 which are in communication with the air supply pipe V, each pipe being controlled by the regulator needle valve H so that its sensitivity may be controlled at will.

As embodied, a switching valve K is provided, which in the position for automatic control, allows the differential air pressure signals established in the lines W1 and W2 by the directional gyro A and the rate gyro F to be transmitted directly to signal lines W11 and W12, respectively (for the setting of reversing valve L1 as shown). The switching valve is shown somewhat diagrammatically in Figures 19 and 20 and comprises a vane 322 which is oscillatably mounted to occlude the ports W1 and W2 or the ports $W2^0$ and $W2^1$ of the valve K. In the position shown in Figure 2 a signal is transferred from the line W1 to the line W11, and correspondingly from line W2 to line W12, while in the position shown in Figure 20, signals are transferred from line $W2^0$ to the line W12, and from the line $W2^1$ to the line W11. Means are provided for switching the valve K from one position to the other and comprise the electromagnets 310, 311 adapted to swing the pivoted armature 312 and on energization of the magnet 311 to cause the contacts at the end of the armature 312 to press the contact on spring leaf 313 into contact with the stationary contact on support 314. Valve K has two definite positions and a quick positive shift from one to the other is insured by the toggle spring 324 mounted in tension between the pin 326 on arm 320, which is fast to vane 322, and pin 325 mounted on toggle link arm 320′, pin 325 being engaged within the forked end 316 of arm 315, mounted on the armature 312, so that the spring is swung past the valve pivot by the oscillations of armature 312.

In one position, the switching valve allows the directional gyro signals to be transmitted to the lines W11 and W12, and in its other position, the signals from the directional gyro A coming through lines W1 and W2 are prevented from influencing the lines W11 and W12.

Steering valve J is effective when the switching valve is in the position shown in Figure 20 (non-automatic) and is adapted to apply suction to line $W2^0$ or $W2^1$ as the valve is swung from its normal central position under influence of a rotating permanent magnet 330 and stationary electromagnet 70R.

Means are provided whereby the pick-off valves from the directional gyro A and from the attitude gyro B are always maintained ready for automatic control operation, once the automatic pilot has been placed in operation, so that the pilot may immediately engage the automatic pilot and place it in control of the airplane at any such time, always subject to his control in case he wishes to manoeuvre the plane.

These synchronizing means E1, E2 and E3 each comprises a chamber 340, the two halves of which are separated by a thin flexible diaphragm 341, each half of the chamber being connected with a differential air pressure signal line 342 so that the diaphragm moves only when the suction in one half of the chamber is different from that in the other half. Diaphragm 341 carries a contact 345 which under the influence of slight suction may contact with a contact 346 or alternatively with contact 347. Three such synchronizing diaphragms are illustratively used.

The main control unit S preferably includes a combined valve controlling the supply of hydraulic pressure and one or more switches causing the electric circuits to be energized to render the automatic pilot effective on the control surfaces of the airplane by motive power supplied hydraulically. Illustratively, the control unit S also includes a centralizing switch by which the automatic control units may be returned to a normal central position so that the aircraft is controlled to assume a level, unbanked, straight course on an arbitrary heading.

As embodied, the unit S comprises a hydraulic valve which is a three-way valve having a valve member 370 adapted to connect port X10 to port X11 so that the hydraulic pressure is supplied through the valve to the transfer valve assembly Q as well as to the servomotor units R1, R2 and R3, or alternatively port X11 may be connected to the return port and line Y thereby relieving the hydraulic pressure on the servo motors as well as the pressure supplied to the assembly Q.

Valve member 370 is connected to lever 373 which is formed with detent surfaces 376 to engage leaf spring 377 by which it is held in either of its two normal positions (Figures 23 and 24). Arm 373 works between stop pins 378 and may be pulled to an extreme clockwise position from which it is returned by leaf spring 379. Arm 373 is connected to pull rod and handle 380 which has three positions, as marked "On," "Off," and "Cent." (Centralizing). In the Off position the arm 373 engages the operating pin of micro-switch 383 to close the corresponding circuit as explained hereinafter, while in its Cent. position the arm 373 engages the pin of micro-switch 384 to close that circuit as explained hereinafter. Figure 23 shows the parts in Off position, Figure 23*a* shows the corresponding position of the valve and Figure 23*b* shows the corresponding position of the switches. Figures 24, 24*a* and 24*b* show the corresponding parts in On position, while Figures 25, 25*a* and 25*b* show the parts in the Centralizing position.

The transfer valve assembly Q has been described generally and includes the transfer or relay valves controlled by the differential air pressure signals transmitted from the stabilizing unit, controlling the main line hydraulic pressure supplied to the servomotors R1, R2 and R3. Each of these transfer valves and its corresponding servomotor may be identical with those of my prior application Serial No. 637,059, now Patent No. 2,598,180, there being three such valves and servomotors provided in the illustrative embodiment of the present invention. The servomotor R2 is controlled by the differential air pressure signal from the directional gyro A modified by the signal from the rate gyro, to control the rudder. The signal from the attitude gyro B transmitted through the lines W3 and W4 is modified by the rate gyro G1 to control the servomotor R1 for the ailerons, while the signals W5 and W6 are combined with the rate signal from rate gyro G2 to control the servomotor R3 for the elevators.

Referring now more particularly to the embodiment of the invention shown in the accompanying drawings, there is depicted in Figure 26 a hydraulic servo-motor system such as is particularly adapted for operating the elevators, ailerons and/or rudders of the aircraft in response to controlling impulses generated by a gyroscope or other base-line indicating device. As shown, a hydraulic servo-motor 410 is operatively coupled by hydraulic lines 411 and 412 to a transfer valve 413 which in turn is operatively coupled by pneumatic lines 414 and 415 to an air signal control valve 16 having the air inlet and eduction lines 33 and 21, respectively.

The system servo-motor 410 as here preferably embodied comprises a cylinder or casing member 419, which is preferably a casting of a strong but light metal e. g. aluminum alloy, capable of withstanding high hydraulic pressures in the order, for example, of 3000 pounds per square inch. The cylinder member 419 is provided with a bore 420 containing a relatively thin cylindrical liner 421, preferably of stainless steel, offering suitable resistance to frictional wear. The liner 421 is annularly spaced from the casing 419 throughout a major portion of its length so as to provide an annular space 422 for liquid therebetween and one end of the liner is snugly lodged in a socket 423 formed by a reduced diameter section of the bore 420. The opposite end of the liner is firmly engaged by a centrally apertured gland member 424 having annular packing rings 425 and 426 by which the gland member 424 is removably tightly sealed to the casing 419 and to piston rod 427, respectively. A split ring 428 engages the casing 419 for holding the gland member 424 in the casing. Orifices 429 in the liner 423 adjacent the gland member at suitably spaced intervals provide ports for the flow of liquid between the annular space 422 and the bore 420 and an annular shoulder 430 extends inwardly from the liner adjacent the orifices 429 to fix the extended position of the piston 431 in the bore 420 as shown in Figure 32.

The piston 431 is mounted on the piston rod 427 at one end thereof and concentrically therewith and carries annular gasket means 431′ by which a sliding seal is effected between the piston and liner. The working faces 432 and 433 of the piston 431 are of unequal area by reason of piston rod 427, the piston and piston rod being proportioned to each other so that the effective area of the working face 433 is less than and in desired proportion to the effective area of the working face 432. Preferably, the area of the working face 432 is twice that of the working face 431 although other suitable proportions may be provided for as hereinafter described.

When the area of the working face 432 is twice the area of the face 433, the piston 431 will be in hydraulic balance where a unit hydraulic pressure on the face 432 is one-half the unit hydraulic pressure on the face 433.

In order to maintain a fluid space between the working face 432 of the piston and the end wall 434 of the bore 420 in the fully retracted position of the piston, as shown in Figure 31, the piston is provided with a spacing member 435 which may be of cylindrical contour as shown and co-axial with the piston rod 427 and it will be apparent that the area of the end of the member constitutes a part of the area of the working face 432 of the piston.

The cylinder member 419 is preferably provided at one end with a laterally extending slide-valve housing 436 preferably integral therewith through which leads a passage 437 connecting the annular passage 422 and the bore 420 at one side of the piston 433 with a terminal port 438 in the housing surface. Another passage 439 leads directly from the bore 420 at the greater area working face side of the piston through the valve housing to a surface port 440. It will be apparent that hydraulic liquid may be supplied through the passage 437, the passage 422 and the several ports 429 to the smaller area working face 433 of the piston and may be separately independently supplied through the passage 439 to the larger area working face 432 of the piston. The pipes 411 and 412 are connected to the cylinder member 419 at the terminal ports 440 and 438, respectively, of the passages 439 and 437, respectively, and may have a threaded connection therewith and are connected thereto in suitable fashion effective to form a liquid-tight joint under high hydraulic pressures.

Valve means are provided for automatically connecting the bore spaces on opposite sides of the piston 431 to each other when the hydraulic pressure on the working face 433 of the piston falls to a selected minimum value so that the piston may be freely slidable in its cylinder. As preferably embodied, a slide valve 441 having pistons 443 and 446 is reciprocably mounted in a valve chamber 442 in the valve housing 436, one end of the valve chamber connecting with the liquid passage 437 so that hydraulic pressure of the liquid in the passage 437 may act against the valve piston 443 to force the valve to the valve-closed position shown in Figures 26, 31 and 32. The valve piston 443, in the valve closed position, as shown in Figures 26, 31 and 32, covers one end of a by-pass passage 444 whose other end terminates in the passage 437. As hydraulic pressure on the piston 443 is reduced, the valve 441 is moved by a spring 445, acting against a piston 446 at the other end of the valve, to a valve-open position, as shown in Figure 30. The pistons 443 and 446 are spacedly connected by a stem member 447 of reducing diameter providing an annular space 448 therebetween forming in effect an enlarged chamber portion in the passage 439. The piston 446 is provided with suitable gasket means 449 forming a sliding seal with the wall of the valve chamber 442 against leakage from the valve housing around the valve spring retaining member 450. An annular shoulder 451 extending inwardly from the valve housing 436 into the valve chamber 442 provides a limit stop against which the piston 443 abuts in the valve-open position, as shown in Figure 30.

It will be apparent that starting with the pressure-off condition shown in Figure 30, hydraulic liquid supplied to the servo-motor via the passages 437 and 439 will fill the annular passage 422 and the bore 420. The liquid entering through the passage 437 acts against the piston 443 to overcome the force of the spring 445 with the results that the valve 441 will be moved to the valve-closed position shown in Figures 31 and 32 thus blocking the by-pass passage 444 which enables the movement of the piston in the pressure-off condition. A balance of the hydraulic forces acting on the working faces 432 and 433 of the piston 431 may be achieved by suitably proportioning the pressures on the opposite side of the piston to each other to compensate for the difference in area of the working faces. Preferably, the area of the working face 432 of the piston 431 is twice that of the working face 433 and the unit hydraulic pressure of the liquid supplied through the passage 437 is preferably twice that of the liquid supplied through the passage 439. It will be apparent that by increasing the unit pressure of the liquid entering through the passage 439, the piston 431 may be moved from the position shown in Figure 31 to the position shown in Figure 32, the unit pressure of the hydraulic liquid at the opposite side of the piston being maintained constant. Similarly, by reducing the unit pressure on the working face 432, the piston may be moved from right to left as viewed in Figure 32. It will therefore be clearly apparent that because the unit pressure on the high pressure side of the servo-motor is maintained constant, a number of servo-motor units may be connected together in a bank for individual operation by manifolding the high pressure side of each to a common header and supplying the low pressure side of each hydraulic unit with hydraulic liquid by a separate line to each unit. In this way, the piping required for the operation of a plurality of servo-motor units may be substantially reduced with concomitant savings in weight and cost and manifest simplification of installation and maintenance problems.

For the purpose of mounting the unit with a view to its use in aircraft, so as to be self-aligning, the cylinder member 419 may be provided with an eye or lug member 452 as best shown in Figure 30, which may threadedly engage the cylinder member 419 at one end thereof and is provided with a self-aligning ball bearing fitting 453 for attaching the unit to a mounting shaft of the aircraft structure. Similarly, the piston rod 427 may terminate in a removable fitting 454 threadedly engaging the rod and provided with a self-aligning ball bearing unit 455 for coupling the piston rod to a rock-shaft or other member to be operated.

The transfer valve 413 as here preferably embodied comprises front and rear body sections 460 and 461 respectively, as are best seen in Figures 26 and 29 inclusive. The respective body sections are firmly but removably secured to each other as by means of a circular row of screws 462 passing through one section into threaded engagement with the other section. The opposing faces of the body sections are fashioned to provide a valve chamber 463, preferably cylindrical, within which is disposed in part a normally hydraulically balanced hydraulic valve member 464. The valve number 464 is shown in its neutral position in Figure 27 and in extreme oppositely displaced positions in Figures 28 and 29, the position shown in Figure 28 corresponding to that of Figure 26, as will be explained more fully hereinafter.

The valve member 464 is preferably provided with oppositely extending and preferably co-axially aligned piston members 465 and 466, preferably of cylindrical contour, which are freely, slidably received in preferably co-axially aligned valve seats or cylinders 467 and 468, respectively, of complementary contour and diameter provided in the valve body sections 460 and 461, respectively. The end faces 469 and 470 of the piston members 465 and 466, respectively, constitute the working faces of the pistons and in accordance with the invention, these faces are of unequal areas corresponding to the ratio of areas of the working faces 432 and 433 of the servo-motor piston 431. To this end, the area of the working face 469 of the valve piston member 465 is larger than the area of the working face 470 of the valve piston member 466, the ratio of areas preferably being in the order of two to one as in the case of the servo-motor 410. Hydraulic pressure liquid is adapted to be supplied to the working faces 469 and 470 through passages 471 and 472, respectively, provided in the body sections 460 and 461, respectively. In accordance with the invention, hydraulic liquid may be supplied to the passage 471 from the pipe 411 and may be supplied to the passage 472 from the pipe 412 which latter is adapted to be supplied with the high pressure hydraulic liquid through a main feed pipe 473 from a high pressure line Z.

The valve member 464 additionally comprises means for shifting the valve member in either direction from its neutral position in response to an external energizing force or impulse as, for example, from the signal control valve 416. As here preferably embodied, a series of highly flexible, fluid-impervious diaphragm members 475, 476 and 477 are secured concentrically of each of the valve members and in axially spaced relation therealong and are fixedly secured at their respective marginal portions in relation to the valve body sections 460 and 461 as will appear more fully hereinafter. More specifically, the diaphragm member 475, preferably of circular contour, is clamped between opposing circular flange members 478 and 479 of the valve member and midway between the diaphragm members 476 and 477. The flange clamping members 478 and 479 may be secured to each other and to the diaphragm member 475 by screws or rivets (not shown) or may be adhesively bonded to the diaphragm member 475. Each flange member is preferably formed integrally with a concentric axially extending clamping boss, the flange member 478 having the boss 480 and the flange member 479 having the boss 481. The bosses 480 and 481 are also preferably of cylindrical contour and disposed to co-act with valve piston heads 482 and 483, respectively, to clamp the diaphragm members 476 and 477 between them. Thus, the boss 480 and piston head 482 clamp the diaphragm member 476 between them, being coupled to each other and to the diaphragm member by means of screws or rivets (not shown) or preferably by adhesive bonding to the diaphragm members with which they are concentric. The boss 481, diaphragm member 477 and piston head 483 similarly coact. Thus, the valve member 464 will be seen to be composed of a plurality of separate elements correlated and coupled to each other and integrated into a unit reciprocable in either direction in the valve piston seats 467 and 468 and the valve chamber 463.

The valve chamber 463 is preferably of cylindrical contour having parallel end walls 484 and 485 recessed to form stepped, concentric, preferably cylindrical wells 486 and 487, respectively, for accommodating the valve piston heads 482 and 483, respectively, as the valve member is displaced to right or left from its neutral position. The extent of axial movement of the valve member 464 is confined to fixed limits by the provision of an annular slot 488 extending radially outwardly from the valve chamber into which extend the valve flanges 478 and 479 and which is partitioned centrally by the diaphragm member 475. The opposite parallel end walls 489 and 490 of the slot provide opposing abutments against which the flange members 478 and 479 may contact as the valve member 464 is displaced to right or left and thus serve to limit the displacement of the valve member in accordance with the predetermined operating characteristics of the valve.

The diaphragm member 475 is received at its outer circumferential margin between the body sections 460 and 461 so as to be held securely thereby and therebetween. Likewise, the diaphragm members 476 and 477 of smaller outside diameter are clamped at their outer circumferential margins to the body sections 460 and 461, respectively, as by means of annular clamping rings 491 and 492, respectively.

It will be apparent that the diaphragms 476 and 477 form with the central diaphragm 475, a pair of hermetically sealed chambers 493 and 494 from which passages 495 and 496, respectively, lead to the outer surface of the body sections 460 and 461, respectively, where they are sealingly connected to air lines 414 and 415, respectively, of the signal control valve 16.

Likewise, the diaphragm members 476 and 477 form with the body sections 460 and 461, respectively, a pair of hermetically sealed compartments 497 and 498 which are connected to each other by a passage 499 leading through the body sections and to the outer surface of the body section 460 where connection is made to a hydraulic liquid return line 500 leading to the liquid sump or reservoir (not shown) of the hydraulic system. Hydraulic liquid which forces its way past the valve pistons 465 and 466 under the hydraulic pressures employed, discharges into the drainage compartments 497 and 498, respectively, from which it may return to the system reservoir through the pipe 500.

The valve piston cylinders 467 and 468 are provided with ports 501 and 502, respectively, both of which are normally just covered and closed by the valve pistons 465 and 466 when the valve member 464 is in the neutral position shown in Figure 27. The ports 501 and 502 are suitably located along the length of the respective cylinders 467 and 468 and the valve piston members 465 and 466 are of such length that as the valve member 464 is moved in one direction or the other from the neutral position, it will immediately start to uncover one or the other of the ports 501 and 502, depending upon the direction it is moved. The port 501 is connected by a passage 503 to the return passage 499 and thence to the system sump by the pipe 500. The port 502 is connected by a bleed passage 504 to the valve piston cylinder 467 at the working face end of the valve piston 465. Thus, as shown in Figure 28, movement of the valve member 464 to the right from the neutral position shown in Figure 27, will uncover the port 502 in part or in whole and result in the formation of a continuous passage for liquid from the entrance port of the passage 472, through the passage 504 to the exit port of the passage 471. Hence, hydraulic liquid supplied to the passage 472 through the pipes 473 and 412 cannot only act against the working face 470 of the piston member 466, but can also act against the relatively large area working face 469 of the valve piston member 465 and against the relatively large area working face 432 of the servo-motor piston 431, so long as the port 502 is uncovered. Similarly, when the valve member 464 is moved from its neutral position to the left, as shown in Figure 29, the port 501 will be uncovered in whole or in part and result in the formation of a continuous liquid passage from the entrance port of the liquid passage 471 through the passage 503 to the exit port of the passage 499. Hence, hydraulic liquid supplied to the passage 471 by the pipe 411 may flow directly to the system return sump through the return line 500.

The signal control valve 16 may be of any suitable type operative to establish a differential pneumatic pressure through the pipes 414 and 415 in the chambers 493—494 for effecting a movement of the valve member 464 in the desired direction and of the desired magnitude. As here preferably embodied, a vane 510 shown in dotted lines is mounted in a casing 511 for angular movement in either direction from a neutral position in alignment with the air inlet and eduction pipes 33 and 21. Preferably, the pipe 21 is connected to a vacuum pump (not shown) and the pipe 33 is open to the atmosphere, although it is obvious that air under pressure may be supplied to the casing through the pipe 33, and the pipe 21 then arranged to discharge to the atmosphere. With the vane 510 in the dotted line position shown, the chamber 494 will be subject to a greater fluid pressure than the chamber 493 and, by reason of the pressure difference acting on the diaphragm member 475, the valve member 464 will be caused to move to the right as shown in Figures 26 and 28. Obviously, the valve member may be displaced in the opposite direction from its neutral position by angular movement of the vane in the opposite direction from its neutral position. In either case, the magnitude of the initial displacement of the valve member 464 will be proportioned in part to the displacement of the vane 510, the vane in turn being controlled manually or automatically, as for example, by precession of a displacement or rate gyroscope, or a combination thereof, in response to a course and/or attitude change of a dirigible vehicle.

In the operation of the hydraulic servo-motor shown in Figure 26, the system is first filled with hydraulic liquid in the required amount with the liquid in the supply pipe 473 at the desired working pressure of, for example, 1000–3000 pounds per square inch. Under these conditions, the unit hydraulic pressure exerted by the liquid on the smaller area working face 433 of the servo-motor piston 431 and on the smaller area working face 470 of the valve piston member 464 is the same. The resulting hydraulic force acting on the working face 433 of the piston 431 is balanced by an equal and opposite hydraulic force on the working face 432, but because of the larger area of the working face 432, the unit hydraulic pressure of the liquid acting on the working face 432 will be at a lower value of, preferably, one half the unit hydraulic pressure on the opposite side of the piston. The same condition will exist with respect to the unit hydraulic pressure on the working face 469 of the valve piston member 465 and the working face 470 of the valve piston member 466. Hence, the servo-motor piston 431 and the valve member 464 will be in hydraulic balance, with the piston 431 at rest and the valve member 464 at rest in the neutral position shown in Figure 27. Assuming now for example that the vane 510 of the signal control valve 416 is displaced from a neutral position in alignment with the ports of the air lines 417 and 418 to a position such as is shown in Figure 26, the suction applied through the pipe 418 will be communicated to the chamber 493 of the transfer valve and atmospheric or substantially atmospheric pressure will be established in the chamber 494. As a consequence of the differential pressure, the valve member 464 will be displaced to the right and, assuming the differential control signal to be of sufficient strength, to the extreme position shown in Figures 26 and 28. The movement of the valve member will result in the uncovering of the bleed port 502 and permit the full system pressure to be applied through the passage 504 to the working face 469 of the valve piston member and to the corresponding working face 432 of the servo-motor piston 431. The resulting unbalanced hydraulic force acting on the working face 432 of the piston 431 will substantially instantly cause the piston 431 to move rapidly to the right as viewed in Figure 26 against the resistance offered by whatever member to which the piston rod 427 is connected. If that member be, for example, the rudder of an aircraft in flight, the rudder will be displaced until the dynamic forces acting thereon attain a value at which the unbalanced hydraulic force acting on the working face 432 is balanced thereby and the piston 431 thereby brought to rest.

The pneumatic displacement force which caused the initial displacement of the valve member 464 is opposed and balanced by the opposing hydraulic force resulting from the increase in hydraulic pressure on the working face 469 of the valve piston member 465 as the port 502 is uncovered. This excess of hydraulic force on the working face 469 will remain, even though the servo-motor piston 431 has come to rest under the balanced forces, until the differential signal pressure in the chambers 493—494 is caused to decay as by initiating restoration of the vane 510 toward its no-signal position. As the signal is caused to decay, the pneumatic displacement force decreases, the balance between the displacement force and the excess of hydraulic force on the working face 469 is upset and the valve member 464 is moved hydraulically toward its neutral position. When the signal has fully decayed, the valve member will have returned to its neutral position, the port 502 will have been covered again and the valve member 464 will be in the neutral position shown in Figure 27. It will be remembered, however, that it was assumed that the piston 431 in its initial displacement was resisted by the dynamic forces acting on an aircraft control member (not shown). This resistive force added to the hydraulic force acting on the working face 433 was balanced by the increased hydraulic force acting on the working face 432 of the piston resulting from the application of the system pressure to the working face 432. Hence, as the hydraulic pressure on the working face 432 is decreased by the covering of the port 502, the dynamic pressure exerted by the control member will continue to act through the hydraulic liquid in the pipe 411 on the working face 469 of the valve piston member 465 and cause the valve member 464 to move to the left, as viewed in Figure 29, thus uncovering the port 501. The hydraulic liquid may in consequence flow through the passages 503, 499 and the system return line 500 to the sump or reservoir not shown to relieve the excess of hydraulic pressure on the working face 469. As the resistive force of the control member on the piston 431 decays through return of the control member to a neutral position, the decreasing unbalanced hydraulic force acting on the piston member 465 permits the valve member 464 to return to its normal neutral condition with the hydraulic forces on the valve member 464 and the piston member 431 in balance.

It will therefore be apparent that displacement of the valve member 464 to the left, as shown in Figure 29, by actuation of the signal vane 510 in a clockwise direction, as viewed in Figure 26, will uncover the port 501 and thus relieve the balancing hydraulic pressure of the liquid on the working face 432 of the piston. So long as this condition is maintained, the full system pressure acting on the working face 433 will function to move the piston 431 to the left as viewed in Figure 26 until the hydraulic pressure differential is balanced as before by the dynamic pressure acting on the control member to which the piston rod 427 is connected. When this condition is attained, the piston 431 will come to rest and remain at rest as the valve member 464 is returned to its neutral position by a decay of the control valve signal. As the pressure on the working face 469 under these conditions will be less than the pressure on the working face 470, the valve member 464 will be automatically displaced to the right, as viewed in Figure 28, the port 502 uncovered and the hydraulic pressure acting on the working face 432 built up. As it builds up, the dynamic force on the control member will return the latter to its neutral position, and hydraulic balance will again be achieved in respect of the piston 431 and valve member 464.

It will be obvious that if the piston 427 be connected to a member offering only frictional resistance to movement, the movement will continue within the limit of movement of the piston 431 until the valve member is returned to its normal neutral position. Return of the piston to its starting position may be effected by movement of the valve member in the opposite direction.

Although the servo-motor shown is of the reciprocating piston-cylinder type, it will be obvious that the piston may be a vane affixed to a shaft journalled for limited angular movement in a cylindrical casing so that the movement of the vane by unbalanced hydraulic forces may rotate the shaft directly. In such case, the shaft may be that upon which a rudder, elevator, aileron, or other control member is mounted, thereby eliminating, or reducing in substantial measure, multiple links, cables, sheaves, push rods and such motion transmitting devices between the servo-motor and the control member and effecting advantageous economies in cost, weight maintenance and the like.

Figures 33*a* and 33*b* show the circuit diagram of the preferred and illustrative embodiment of the entire flight control circuit. Figure 34 shows a simplified fundamental circuit which is used in a more complex form for each of the reversible electric motors in the illustrated embodiment.

In Figure 34, the direct current power is derived from a source D–2, grounded at D–3 and connected to a main D–5. A potentiometer D–4 is connected between main D–5 and ground D–6 and serves as a voltage divider or polarity changer, the ground D–6 being negative while the main D–5 is positive with reference to each other or to the center tap D–7. A polarity changing relay is connected in the circuit. Its magnet D–13 causes contact bearing armature D–12 to bear against contact D–10, while magnet D–14 contacts D–12 with contact D–11. Contacts D–12, D–10 and D–11 are connected to conductors D–15, D–5 and D–8, respectively. Conductors D–15 and D–7 supply reversible permanent field magnet motor D–16 to energize it reversibly. When contact D-12 is in contact with D-10 the motor D-16 rotates in one direction, and on energization of magnet D-14, contact D-12 contacts D-11 to reverse the motor D-16.

Such a reversible motor circuit permits the use of single pole—double throw switches instead of the more conventional double pole, double throw switches and thereby simplifies the control of the several motors illustratively used.

In the system, power is supplied through the main C210 and through the ground of the system. This power is preferably direct current at a voltage of about 28.5 volts and goes to conductors C27 and C61 to the voltage divider C150, the other side of which is grounded through C60. The center tap of the divider is connected to C57, C24 and C2 to connector and cable C200 as well as to C34 and C7 and connector and cable C202, and also to C52 and C26 and to connector and cable C208. In the various connector plugs the terminals at the two ends of the cable are identified with the same reference characters, while the cable is shown as a single dotted line running from one unit to another.

In the actual construction, the connector plugs are preferably keyed so they can be plugged in only in one position, each of the conductors is numbered along its length so it may be easily identified, and the several units are separately housed and may be completely detached from each other by removal of the connector plugs.

Thus power is supplied to the bank and climb unit B through C2, to the directional gyro unit A through C7, to the on-off controls S through C9 and to the stabilizing unit D through C26.

The units including a motor or magnet winding are provided with a neutral conductor, and a positive conductor and have their own grounds. Thus, the neutral conductors for the directional gyro unit A, the bank and climb unit B, and the stabilizing unit D are C7, C2 and C26, respectively. The positive conductors for these units are C1 and C17 while C8 may be positive or negative depending on its direction of operation.

When the on-off control is in "Off" position, and the airplane is in flight, the synchronizing system is operative, readying all of the controls for operation when desired. In this condition, switch 383 is closed and power is supplied through C11 and C38 to relay C170 as well as to the switching valve and relay coil 311 so as to swing the armature 312 clockwise and connect C69 to C70. In this condition, C11 is connected to C49, C23, C208, C23, C68, C67, coil 311 and ground.

The directional gyro unit A is connected to synchronizing means E1 from neutral C7, C89 motor winding 116, C90, C8, C35, C48, C22, C208, C22, C69 armature 312, contact 314, C70 to the diaphragm carried contact 345, of synchronizing means E1 and thence to either contact 346 or 347, depending on whether or not suction is applied to one side or the other of the diaphragm. If current is supplied to contact 346, it goes through C64, and C65 to the other two synchronizing means. At the same time, current is supplied through C63, C66, C62, C17, C208, C17, C43 and the positive main C27. In this condition motor 116 is driven so as to centralize valve sleeve 108 with respect to vane 107 thereby reducing the signal to zero, opening the contacts 345, 346 and stopping the motor. If contact 345 engages 347, the operation of motor 116 is reversed as C8 is negative and is connected through C202, C8, C35, C48, C22, C208, C22, C69, armature 312, contact 314, C70, jumper C71, contact 347, C76, and C77 to ground which is negative.

The aileron control motor 240 is reversibly operated in a generally similar manner from synchronizing means E2 so that it keeps the valve 213, 214 centralized. When there is a deviation from centralized position, motor 240 is connected to neutral C2, C110 and to C108 which may be positive or negative depending on the direction required of motor 240. C108 is connected to C6, C200, C6, C33, C131, C44, C18, C208, C18, C72 and jumper C73 to the central contact 345 of E2. Depending on direction of operation E2 is connected to C88, C76, C77 and negative ground, or alternatively to C64, C63, C66, C62 and positive C17.

The elevator control motor 270 is somewhat similarly connected to synchronizing means E3. On one side, motor 270 is connected to neutral C2 through C104 and on the other side to C106 which may be negative or positive. C106 is connected to C4, C200, C4, C31, C130, C45, C19, C208, C19, C87, jumper C74 and through diaphragm contact 345 to C65 or C75. Negative potential is applied through C75, C88, C76, C77 and ground. Positive potential is applied through C65, C64, C63, C66, C62 and positive C17.

In Figures 33*a* and 33*b* the circuit is shown in "On" flight condition giving stabilized flight and without directional control, but ready for directional control, maneuvering control or centralizing control, at the will of the pilot. In this condition, the plane will maintain its attitude; climb and turn, straight dive, increasing climb, or any other attitude.

Placing on-off control S in the position of Figures 24, 24*a* and 24*b*, opens switch 383, deenergizing relay C170, thereby rendering the synchronizers E2 and E3 ineffective to change the motors 240, 270. In this condition the signals from the attitude gyro B and rate gyros F, G1 and G2 are transmitted directly to the transfer valves Q to maintain the same flight attitude, while synchronizing means E1 continues to function to centralize the valve 108 and thus render it ineffective to create a signal.

When it is desired to maintain direction of flight without changing the condition of the elevators or ailerons, the pilot depresses the maintained direction switch button at the upper end of the control lever C.

This closes the maintained direction switch (Figure 33*b*) connecting C96 to ground and supplying current through C13, C206, C13, C40, C47, C21, C208, C21, C78 relay coil 310, C66 and C62 from positive C17. The energizing of coil 310 swings armature 312 to switch valve K so as to block ports W1, W2 and opens contacts 312, 314 thereby interrupting the synchronizing circuit for the directional gyro motor 116.

With on-off control S in "On" position, the pilot may maneuver the plane through manual controller C. Moving it to the left causes the plane to make a coordinated left turn; i. e. as it banks to the left, left rudder is applied through steering magnet 70R Fig. 21 to apply the rudder as the bank increases. In this position grounded (negative) C100 is connected by the left bank switch to C102, C97, C14, C206, C14, C46, C20, C208, C20, C80, C86 aileron booster variable rheostat C180, C83, aileron boost torque magnet 70A, C82, C81 to neutral C26, thereby causing a momentary increase in the aileron signal transmitted to the aileron transfer valve Q and corresponding adjustment of the pressure in line Z controlling the movement of the aileron servomotor R1.

The intensity of this booster signal can be increased or decreased by adjustment of resistor C180.

At the same time a temporary signal is produced for the rudder, rudder boost torque magnet 70R being connected parallel to magnet 70A.

A right bank switching movement establishes the circuit C27, C39, C12, C206, C12, C95, C99 right bank switch, C97, C14, C206, C14, C46, C20, C208, C20, C80, C86, C180, C83, magnet 70A, C82 (and also magnet 70R in parallel), C81 and neutral C26 causing the magnets 70A and 70R to be reversely actuated.

Right or left bank control operation of controller C also energizes relay coil C190, parallel to magnet 70R, causing C67 to be connected to C62 and C66, rather than to C68. When so connected magnet 311 is energized by connection to grounded C77 and to C67, and to C62, and positive C17, thereby causing actuation of the switching valve to restore it to the position of Figure 2 and connecting C69, armature 312 and contact 314 to reestablish the synchronizing circuits so that the directional gyro valve 108 is reversibly steered through the synchronizing means E1, the signal which actuates the transfer valve simultaneously actuating the synchronizing means E1 to cause motor 116 to be reversibly energized.

The dive and climb operations are generally similar. For climb, the controller C is actuated by pulling the stick back to close the forward "climb" switch actuator. Thereby a circuit is closed as follows: C210, C27, C39, C12, C206, C12, C95, climb switch, C98, C15, C206, C15, C42, C50, C24, C208, C24, C84, elevator boost rheostat C181, C85 elevator boost torque magnet 70E, C82, C81 to neutral C26.

Reverse operation is caused by pushing the stick of controller C forward to cause the following circuit to be established: ground, C100 dive switch, C101, C98, C15, C206, C15, C42, C50, C24, C208, C24, C84, C181, C85, 70E, C82, and C81 to neutral C26.

During these dive and climb operations the synchronizing valve E3 is not operative to control motor 270.

Due to the balancing of pressures in the servomotor R2 and the transfer valves Q, the rudder after the initial boost will trail properly in the slip stream and establish its own position for a properly coordinated turn.

"Centralizing" is accomplished by temporarily pulling and holding all the way back on the handle 380 of switch S to move the parts to the position of Figures 25, 25*a* and 25*b*. In this position, switch 384 is closed and positive C9 is thereby connected to C93, C10, C204, C10, C37 and centralizing relay C160 to ground. Thereby C31 and C33 are connected to C30 and C32, respectively, shunting C3 and C105 to C4, C106 and C5, C107 to C6, C108.

Motor 270 is now reversibly actuated by switch actuator 264. When centralized contact 265 is connected by C107, C108 to one end of winding 240 while the other end of winding 240 is connected to neutral C110 and C2. Depending on which way the vane 268 must be moved to centralize contact 265 it contacts with positive contact 266 or with negative grounded contact 271 and motor 270 runs until the contact 265 is centralized thereby placing the valve in neutral or centralized position, and causing a signal which diminishes as the airplane returns to level, unbanked, straight flight.

For the aileron, the contact 217 may contact with positive contact 219 or negative grounded contact 221 to actuate motor 270 in one direction or another.

By depressing the maintained direction button on controller C and simultaneously moving the stick to right or left, the plane may be rolled at will on a straight course.

*Operation*

The operation of the illustrated form of the invention may be summarized as follows:

The operation of the automatic pilot is based on the gyroscopic principle of rigidity. A gyroscope, which is universally-mounted, fast-spinning wheel, tends to maintain its spin axis rigidly in space regardless of the movements of the supporting body. This property is utilized to establish a reliable flight reference within the airplane from which to detect and correct deviations from any desired attitude.

Five gyroscopes are used in this automatic pilot: two displacement gyros and three rate gyros. One displacement gyro is located in the directional gyro control unit A and the other is located in the bank and climb control unit B; the three rate gyros F, G1, G2 are located in the stabilizing unit D. The displacement gyros are sensitive to the amount of deviation and the rate gyros are sensitive to the rate of deviation. The indications of the gyros are utilized through a pneumatic-hydraulic system to obtain corrective movements of the airplane controls.

This automatic pilot is operable under five separate conditions.

Automatic pilot "off"—synchronizing. With the airplane in flight and the on-off control handle S in the "off" position, the synchronizing system is operative. This is the equivalent of continuous automatic adjustment and assures continuation of flight attitude existing at the moment the automatic pilot is engaged.

Automatic pilot "on"—stabilized flight without direction control. At the moment of pulling the on-off control handle S to "on" position, the synchronizing system ceases for the bank and climb gyro control units B. The effect of this is to cause the aircraft to continue in whatever flight attitude it was in, i. e., if in a climbing turn, it will continue to climb and turn. This allows the operator complete freedom in engaging the automatic pilot since no trimming or adjustments for position are necessary.

Automatic pilot "on"—stabilized flight with direction control. With the automatic pilot "on," direction control can be established at any time by depressing the straight-course button on controller C. This causes the synchronizing system to cease for the directional gyro control and the plane will maintain the course it was on at the moment of depressing the button.

Automatic pilot "on"—maneuvering control. With the on-off control handle S in the "on" position, the plane can be maneuvered by manipulation of the control lever C in the cockpit.

Automatic pilot "centralized"—centralizing control. With the on-off control handle S held in the "full-out" or "centralized" position, the plane will automatically return to straight and level flight from any attitude within the limits of the gyroscopes of the automatic pilot.

On-off control. Assuming the engine to be running and the battery supply "on," the operation is as follows:

With the control handle in the "off" position, Figure 23, the hydraulic system pressure port X is closed and the pilot supply pressure port is connected to the return port Y. Also, switch 383 is in the "closed" or "on" position and switch 384 is in the "open" or "off" position. The air and electrical circuits keep the automatic pilot in synchronization with the attitude of the airplane so that at any time the pilot is engaged, it will continue to maintain the attitude of the plane existing at that moment. This feature eliminates any tendency to jolt the aircraft when the pilot is engaged.

With the handle in the "on" position, Figure 24, the hydraulic system pressure line is connected to the pilot pressure line X, the return port Y at the valve is closed, and switches 383 and 384 are both in "off" position. At the time of application of the control to "on," the automatic pilot will take control and maintain the attitude of the aircraft until a change of attitude is effected by means of the controller C, or until the pilot is overpowered by the conventional airplane control stick.

With the control handle in the "centralized" position, Figure 25, the hydraulic valve remains ported as in "on" position, switch 383 remains in the "off" position, and switch 384 is in the "on" position. Switch 384 energizes electrical circuits which ultimately bring the airplane to straight and level flight, direction depending upon whatever heading the plane was maintaining when the control was pulled. The control S must be held in this position until straight and level flight or the desired recovery is attained.

In "positions off and on," the handle S is held in place by a detent, as shown. In "position centralizing" the handle must be held manually since the detent spring tends to return to "position on."

Stabilizing unit. The primary function of the stabilizing unit D shown schematically in Figure 2, is to prevent hunting and to control the rate of change of attitude. It also controls the synchronizing mechanism which insures zero signal, within pilot operating limits, at the moment of engaging the pilot.

Anti-hunt. The anti-hunt mechanism consists basically of three rate gyros sensitive to rotation about each of the three axes. Each gyro controls a separate air valve which is connected in parallel with its respective signal given by the directional gyro control and the bank and climb control. The elevator rate gyro, G2, a typical rate gyro air valve assembly, is shown in Figure 11. The gyro rotor 11, spun by air from jet 12, revolves with its axis parallel to the longitudinal axis of the airplane and with its gimbal ring axis vertical. Rotation of the airplane about its lateral axis, i. e., climb or glide, will cause the gyro to precess causing shaft 15 to turn clockwise for nose going up, and counterclockwise for nose going down. This motion is transmitted through linkage to the vane of air valve 30 causing a differential air signal to be superimposed upon the differential signal coming from the elevator air valve 268 in the bank and climb control unit B. During the initial stage of any deviation from level flight, the rate gyro air valve G2 signal is additive to the signal from the bank and climb unit B, but when the corrective elevator has stopped the deviation and the plane starts to return to course, the rate gyro precesses in the opposite direction and the rtae gyro air valve signal is subtractive from the bank and climb control signal. If the rate of return is too fast, the rate gyro signal will exceed the bank and climb control signal thereby giving reverse control and stopping the maneuver before overshooting. A further refinement of the intensity of the corrective control is provided by dashpot 60. (The torque motor 70 is connected with the controller unit C and is used in conjunction with maneuvering flight.)

Synchronization. The synchronizing mechanism consists basically of three diaphragms 341 controlling three pick-off motors 116, 240, 270, geared to the rotating sleeves around the rudder, elevator, and aileron air valves 108, 214, 269 in the directional gyro and bank and climb control units. The synchronizing diaphragm consists of two air chambers separated by a flexible membrane 341. Each chamber is connected in parallel with the two air signal lines W from each of the three air valves. An unbalanced condition will cause the membrane to deflect to the right or left closing electric switches which run the pick-off motors clockwise or counterclockwise so as to bring the signal back to zero, or balanced condition. These electrical circuits are operative whenever the airplane master battery switch P is "on" and the automatic pilot control handle S is in the "off" position. Therefore, as long as the automatic pilot is in the "off" position during flight, the pick-off sleeves will always be in a position to give a zero signal and at the moment of engagement, the pilot will take over in whatever attitude the plane may be flying.

The stabilizing unit also contains the steering valve J, switching valve K, and torque magnets 70 and relays to operate them. These are concerned with maneuvering flight.

Controller. In function, the control lever C duplicates effectively for the automatic pilot the control features of the conventional airplane control stick and rudder pedals. Movement of the lever in a manner similar to the operation of a normal airplane control stick controls four switches which will produce, within limits of the automatic pilot, the same results obtained by similar movement of the airplane control stick, i. e., left bank, right bank, climb, dive.

The button on the lever C controls a fifth switch which is used to engage the course-holding function of the automatic pilot, i. e., to maintain the airplane on a particular course. Depressing the button throws a switching relay 312 in the stabilizing unit D which disconnects the synchronizing mechanism E1 of the directional gyro control A and operates the switching valve K so that the directional gyro air signals are connected directly to the transfer valve Q. The button is also depressed when it is desired to bank the aircraft and still maintain direction, i. e., bank without turn.

A co-ordinated turn is effected if the control lever is placed in either the "left" or "right" bank position and the button is not depressed. In all instances of operation, the lever must be held in its proper position until the degree of the desired maneuver is accomplished.

Directional gyro control unit. In the directional gyro control unit A, the relative position of the gyro and the airplane is measured by an air pick-off system contained in the upper part of the gyro case. Signals from this unit control the rudder movement. The control unit consists of an inner vane 107 mounted directly on the vertical gimbal ring 105 of the gyro, and a rotatable sleeve 108 into which fits the vane. The sleeve contains four ports 109, 110, 111, 112, which are set 90 degrees apart.

Port 110 leads to the atmosphere through an air filter; port 109 directly opposite it, leads to the vacuum supply; and, ports 111, 112 lead through collector rings and lines W1 and W2, respectively, to the transfer valve Q. An unbalance of pressure in lines W1 and W2 causes movement in the transfer valve which controls rudder movement.

The outer sleeve 108 can be driven in either direction by an electric motor 116 which is controlled by the synchronizing diaphragm when the pilot is in the "off" position.

In the neutral position, i. e., when the airplane is exactly on course (schematically shown in Figure 4), the vane 107 substantially covers ports 110 and 109 allowing an equal signal to be supplied through lines W1 and W2, thereby causing no movement of the diaphragm in the transfer valve.

With the automatic pilot "off," or with the automatic pilot "on" but with the direction control "off," the directional gyroscope synchronizing mechanism is operative. The synchronizing diaphragm is connected in parallel with lines W1 and W2 so that a differential air signal in the lines will close electrical contacts and cause the motor 116 to revolve in the proper direction to bring the ports in position as shown in Figure 4. This again balances the pressure in the lines.

When the automatic pilot is "on" and the straight-course button is depressed, the synchronizing circuit to motor 116 is cut locking the sleeve 108 to the instrument frame. Any subsequent deviation of the plane from its course will cause the sleeve to turn about the vane, the latter being fixed, relative to the earth, by the gyro. This will bring into play the conditions shown in Figure 3 or Figure 5, depending upon the direction of deviation. In either case, an unbalance is produced in the signal lines causing the transfer valve to produce corrective rudder.

Bank and climb control unit. The air signals for aileron and elevator control originate in the bank and climb control unit B. Basically, this unit is a gyroscope which, by virtue of its position relative to the case of the instrument, controls two air valves; each valve is similar to the one described in the directional gyro unit A.

Figure 8, which is a schematic breakdown illustration of the bank and climb unit, shows the method by which these valves are controlled. The gyro rotor, contained in housing spins with its axis of rotation vertical. Due to the gyroscopic principle of rigidity, this axis will tend to remain vertical in space while the outer case shifts about it as the airplane rolls or pitches. Roll of the airplane will cause the case to revolve about the gimbal pivots 205. This rotates gear 211 operating the vane of the aileron air valve 214. Pitching of the airplane causes movement of elevator air valve 269 through nylon cord 260 and linkage 207, 208, etc.

The operation of the air valves is identical with the directional gyro air valve except that each of the former incorporates an electrical centering switch. The position of the switch is determined by the relative position of the vane and the pick-off sleeve, and its function is to control the rotation of the pick-off motors 240, 270 so as to return the plane to level flight when the on-off handle S is pulled to the "centralized" position. Bar 209 is the standard visual horizon reference market.

Atmospheric pressure reaches one side of the valves through the filtered-air supply V, and the drilled shafts in the air vanes. Vacuum supply is connected to the other half of the valves through the opposite end of the shaft.

In the position shown in Figure 8, the aileron air valve 214 is producing a zero signal, whereas the elevator air valve 269 is producing a differential signal.

Transfer valves assembly. The function of the transfer valves assembly Q is to transform the differential air signals from the gyro units into a corresponding hydraulic pressure which is transmitted to the servo cylinders R. There is one transfer valve for each controlling surface (rudder, elevator and aileron), the operation of each valve being identical. The air signals are transmitted to chambers separated by diaphragm 475. When the signals are equal, the diaphragm assembly remains in the neutral or balanced position, the position shown. In this position, hydraulic system pressure is exerted on the left end of valve stem 466 and a varying pressure is exerted on the right end of valve stem 465. The area of the valve stem 465 is twice the area of valve stem 466, so that when the varying pressure is equal to one-half the system pressure, the diaphragm assembly will be in its balanced position.

When the air signals are such that vacuum is directed into chamber 493 and atmosphere into chamber 494, the difference in pressure causes the diaphragm assembly to move toward the right. In so doing, valve stem 466 uncovers the port to passageway 504 and connects it with full system pressure. When the varying pressure acting on the valve stem 465 increases so that it balances the difference in pressure between the two air signals, the diaphragm assembly will move back to the left and again assume its balanced condition.

When the pressure in chamber 494 becomes less than that in chamber 493, the diaphragm assembly moves toward the left uncovering the port to passageway 503 and connecting it with the varying pressure line. (Passageway 503 leads to the return line to the reservoir.) In this position, some of the varying pressure fluid is relieved and when it decreases so that the system pressure acting on valve stem 466 can balance the difference in pressure between the two air chambers, the diaphragm assembly will again move back to the balanced condition and block of passageway 503.

The varying pressure is transmitted to the servo cylinder R causing the servo piston to retract or extend depending upon the variation in pressure.

Servo cylinder. There are three identical servo cylinders R, one for each controlling surface. Their operation is similar to a typical double-acting hydraulic actuating cylinder, a force being transmitted to the controlling surface on both the inward and outward strokes of the piston in the servo cylinder.

The piston rod side of the piston is always at a constant system pressure; the piston head is acted on by a varying pressure. The design of the piston is such that when the varying pressure is equal to one-half the system pressure, the piston will be in a balanced, or neutral position. Therefore, an increase in varying pressure, determined by the transfer valve Q, will cause an unbalanced condition and the piston will extend. Likewise a decrease in varying pressure will cause the piston to retract.

Within the servo is a by-pass chamber which contains an automatic, spring-loaded by-pass valve. When the control handle S is in the "off" position, the by-pass valve relieves the pressure on both sides of the piston and allows the controls to be moved freely by the operator. With the hydraulic pressure "off," the tension of the spring forces the valve to the right uncovering a port which connects the system pressure line with the varying pressure line thereby permitting the piston to have freedom of movement in either direction.

Typical operation. To explain a typical action of the automatic pilot, the aileron control of the bank and climb unit will be used. The rudder and elevator controls are operated in a similar manner.

For the illustrative example, the following condition has been chosen arbitrarily: control handle in the "on" position—automatic pilot on stabilized flight with directional control. In Figure 27, the airplane is being displaced in roll so that one wing is lower than the other. The rotation of the airplane about its longitudinal axis produces a pair of differential air signals which are conducted into the stabilizing unit where an aileron rate gyro air valve is connected in parallel with them. (The rate gyro responds to the rate of maneuver and regulates the maneuver.) As the plane is being displaced the vane in the rate gyro is deflected to position so that it produces a pair of differential air signals, proportional to the rate of displacement. The air signals from the rate gyro G1, therefore, are additive to the air signals from the control unit B and produce the maximum corrective aileron. At the moment that this correction brings the roll to a halt, the vane in the rate gyro returns to a neutral position. As the wing starts to return to level position the vane assumes a position so that the differential air signals governed by the rate gyro will be subtractive from the control unit air signals and may exceed them giving reverse control at the moment preceding the attainment of level position. This eliminates hunting.

The combined differential signals then pass to the transfer valve where they produce movement of the diaphragm assembly with resultant movement of the servo piston causing corrective aileron.

The invention in its broader aspects is not limited to the specific mechanisms shown and described but departures may be made therefrom within the scope of the accompanying claims without departing from the principles of the invention and without sacrificing its chief advantages.

What is claimed is:

1. In an automatic pilot for dirigible craft, at least one signal operated means; a primary signal supply circuit for said means; an additional separate signal supply circuit for said means; a switching valve normally connecting said means to its separate signal supply circuit and for optionally connecting said means to its primary signal supply circuit; said primary circuit including a standard of position, a rate of turn gyroscope, a displacement signal valve means and a rate of turn signal valve means, the displacement and rate of turn valve means being controlled separately by the standard of position and by the rate of turn gyroscope, respectively, for establishing separately proportionate displacement and rate of turn signals in the circuit; a signal responsive synchronizing means operatively connected to the displacement signal valve means for automatically normally maintaining said displacement signal valve means in a zero signal condition; manually operated means for optionally inactivating said synchronizing means; and, separate manually operated means for activating said switching valve to carry out the optional connection aforesaid of said signal operated means to its primary signal circuit and for simultaneously inactivating the synchronising means of said primary signal circuit.

2. In an automatic pilot for aircraft, a signal supply circuit for one of a plurality of axes of the aircraft including a standard of position gyroscope and a rate of turn gyroscope and differential air signal pick-off devices on each; the standard of position pick-off device supplying a differential air-signal when the aircraft is displaced with respect to the standard and the rate of turn gyro pick-off device providing a differential air-signal when there is a rate of change of the rate of turn of the aircraft about the axis, said rate signal being additive to said displacement signal in checking displacement of the aircraft about said axis and subtractive therefrom in the restoring of the aircraft to its original position relative to said axis, and separate pilot operated means for selectively activating the standard of position pick-off device to maneuver the aircraft at will.

3. In an automatic pilot for aircraft, a signal supply circuit for one or a plurality of axes of the aircraft including a standard of position gyroscope and a rate of turn gyroscope and differential air-signal pick-off devices on each, the standard of position pick-off device supplying a differential air-signal when the aircraft is displaced with respect to the standard and the rate of turn gyro pick-off device providing a differential air-signal when there is a rate of change of the rate of turn of the aircraft about the axis, said rate signal being additive to said displacement signal in checking displacement of the aircraft about said axis and subtractive therefrom in the restoring of the aircraft to its original position relative to said axis; a reversible motor drivingly connected to said standard of position pick-off device; automatic control means coupled to said motor through a relay for reversible actuation thereof to restore said standard of position pick-off device to a central zero signal position; and manually operable control means coupled to said relay for rendering said automatic control means ineffective and placing the aircraft under the pilot's control at his option.

4. In an automatic pilot for dirigible aircraft, the combination of positionally stationary means; pickoff means on said positionally stationary means; power means operatively connected to and controlled by said pickoff means for controlling the movement of the aircraft about its axes of roll, pitch and yaw; motor means affixed to the positionally stationary means and drivingly connected to said pickoff means for varying the relation between said positionally stationary means and the pickoff means; a unitary control means operatively connected to said pickoff means, said unitary control means having three positions and including means operative in a first position for controlling the movements of the pickoff means proportionally to the movements of the aircraft while maintaining said pickoff means ineffective to control said power means, means operative in a second position of the control means for rendering said pickoff means effective to maintain control of the aircraft movements, and means operative in a third position of the control means for restoring said pickoff means to normal position corresponding to a predetermined attitude of the aircraft while maintaining said pickoff means effective to control said power means.

5. An automatic pilot for maintaining an aircraft in a desired attitude and on a fixed course by simultaneous control of the ailerons, elevators and rudder of the aircraft comprising a pair of displacement gyroscopes; valve means on said gyroscopes for producing signals of the amount of displacement of the aircraft in attitude and course; anti-hunt means connected to said valve means for producing signals of the rate of change in attitude and course and superimposing these rate of change signals upon the displacement signals; servo means operatively connected to said anti-hunt means and to the control surfaces of the aircraft for operating the ailerons, elevators and rudder in response to the combined displacement and rate of change signals; switch means connected to said gyroscopes permitting the automatic pilot to be turned on and off; and synchronizing means operatively connected to said valve means for automatically maintaining said valve means in a zero signal position when the switch means is in the off position.

6. An automatic pilot for maintaining an aircraft in a desired attitude and on a fixed course by simultaneous control of the ailerons, elevators and rudder of the aircraft comprising a pair of displacement gyroscopes; pickoff means on said gyroscopes for producing signals of the amount of displacement of the aircraft in attitude and course; anti-hunt means connected to said pickoff means for producing signals of the rate of change in attitude and course and superimposing these rate of change signals upon the displacement signals; servo means operatively connected to said anti-hunt means and to the control surfaces of the aircraft for operating the ailerons, elevators and rudder in response to the combined displacement and rate of change signals; switch means connected to said gyroscopes permitting the automatic pilot to be turned on and off; and synchronizing means operatively connected to said pickoff means for automatically maintaining said pickoff means in a zero signal position when the switch means is in the off position.

7. An automatic pilot for maintaining an aircraft in a desired attitude and on a fixed course by simultaneous control of the ailerons, elevators and rudder of the aircraft comprising a pair of displacement gyroscopes; pickoff means on said gyroscopes for producing signals of the amount of displacement of the aircraft in attitude and course; anti-hunt means connected to said pickoff means for producing signals of the rate of change in attitude and course and superimposing these rate of change signals upon the displacement signals; and servo means operatively connected to said anti-hunt means and to the control surfaces of the aircraft for operating the ailerons, elevators and rudder in response to the combined displacement and rate of change signals.

8. In an automatic pilot for maintaining an aircraft in a desired attitude and on a fixed course by simultaneous control of the ailerons, elevators and rudder of the aircraft, a displacement gyroscope; a displacement signal valve on said gyroscope for producing signals of the amount of displacement of the aircraft in one of the axes of yaw, pitch or roll; a rate gyroscope; a rate signal valve on said rate gyroscope and connected to said displacement valve, said rate signal valve producing signals of the rate of change in the said axis and superimposing these rate signals upon the displacement signals; and servo means operatively connected to said rate signal valve and to one of the control surfaces of the aircraft for operating said surface in response to the combined displacement and rate of change signals.

9. In an automatic pilot for maintaining an aircraft in a desired attitude and on a fixed course by simultaneous control of ailerons, elevators and rudder of the aircraft, a directional gyroscope; a displacement signal valve on said gyroscope for producing signals of the amount of displacement of the aircraft in the axis of yaw; a rate gyroscope; a rate signal valve on said rate gyroscope and connected to said displacement signal valve, said rate signal valve producing signals of the rate of change in the axis of yaw and superimposing these rate signals upon the displacement signals; a lead connecting said rate signal valve with a servo which is in turn connected to the aircraft rudder; a switching valve positioned in said lead; and an operator's maneuvering control connected to said switching valve, said control including means for activating said switching valve, whereby the servo can be selectively controlled by the combined displacement and rate of change signals or by the operator's maneuvering control by adjustment of the switching valve.

References Cited in the file of this patent

UNITED STATES PATENTS

| | | |
|---|---|---|
| 1,339,332 | Greenly | May 4, 1920 |
| 2,005,530 | Boykow | June 18, 1935 |
| 2,144,616 | Carlson | Jan. 24, 1939 |
| 2,190,390 | Thiry | Feb. 13, 1940 |
| 2,210,916 | Kenyon et al. | Aug. 13, 1940 |
| 2,210,917 | Kenyon et al. | Aug. 13, 1940 |

(Other references on following page)

UNITED STATES PATENTS

| | | |
|---|---|---|
| 2,238,300 | Zand et al. | Apr. 15, 1941 |
| 2,259,600 | Alkan | Oct. 21, 1941 |
| 2,270,875 | Hanson et al. | Jan. 27, 1942 |
| 2,280,116 | Carlson | Apr. 21 1942 |
| 2,283,754 | Matthews | May 19, 1942 |
| 2,327,171 | Carlson | Aug. 17, 1943 |
| 2,393,892 | De Ganahl | Jan. 29 1946 |
| 2,415,429 | Kellogg | Feb. 11, 1947 |
| 2,415,430 | Frische et al. | Feb. 11, 1947 |
| 2,416,097 | Hansen | Feb. 18, 1947 |
| 2,464,629 | Young | Mar. 15, 1949 |
| 2,611,560 | Harcum et al. | Sept. 23, 1952 |